US012665647B2

(12) United States Patent
Koskela et al.

(10) Patent No.: US 12,665,647 B2
(45) Date of Patent: Jun. 23, 2026

(54) ADAPTIVE CONFIGURATION FOR MONITORING A DOWNLINK CONTROL CHANNEL

(71) Applicant: Nokia Technologies Oy, Espoo (FI)

(72) Inventors: Timo Koskela, Oulu (FI); Samuli Heikki Turtinen, Ii (FI); Sami-Jukka Hakola, Kempele (FI); Jorma Johannes Kaikkonen, Oulu (FI); Karol Schober, Helsinki (FI); Juha Pekka Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 725 days.

(21) Appl. No.: 18/020,457

(22) PCT Filed: Aug. 12, 2020

(86) PCT No.: PCT/EP2020/072685
§ 371 (c)(1),
(2) Date: Feb. 9, 2023

(87) PCT Pub. No.: WO2022/033678
PCT Pub. Date: Feb. 17, 2022

(65) Prior Publication Data
US 2024/0015759 A1 Jan. 11, 2024

(51) Int. Cl.
*H04B 7/06* (2006.01)
*H04W 16/28* (2009.01)
*H04W 72/231* (2023.01)

(52) U.S. Cl.
CPC ..... *H04B 7/06952* (2023.05); *H04B 7/06968* (2023.05); *H04W 16/28* (2013.01); *H04W 72/231* (2023.01)

(58) Field of Classification Search
None
See application file for complete search history.

(56) References Cited

U.S. PATENT DOCUMENTS

| | | | | | |
|---|---|---|---|---|---|
| 11,470,575 B2 * | 10/2022 | Agiwal | | | H04W 28/14 |
| 2018/0219606 A1 * | 8/2018 | Ng | | | H04L 5/0048 |

(Continued)

FOREIGN PATENT DOCUMENTS

WO WO 2020/141014 A1 7/2020

OTHER PUBLICATIONS

"New WID: UE Power Saving in NR", 3GPP TSG RAN Meetings #84, RP-191607, Agenda Item: 9.4.6, CATT, Jun. 3-6, 2019, 5 pages.

(Continued)

*Primary Examiner* — Otis L Thompson, Jr.
(74) *Attorney, Agent, or Firm* — Carter, DeLuca & Farrell LLP

(57) ABSTRACT

According to an aspect, a method for configuring user devices to monitor a downlink control channel includes receiving, by a user device from a base station in a wireless communication system, a signaling message identifying beam information, and determining, by the user device, whether the beam information is associated with at least one adaptive configuration parameter for monitoring a downlink control channel using parameter mapping information, where the parameter mapping information associates adaptive configuration parameters with one or more of a plurality of beam information. The method includes applying the at least one adaptive configuration parameter to configure the user device to monitor a downlink control channel in response to the beam information being determined as associated with the at least one adaptive configuration parameter.

18 Claims, 12 Drawing Sheets

(56)        References Cited

U.S. PATENT DOCUMENTS

| | | | | |
|---|---|---|---|---|
| 2018/0220398 | A1* | 8/2018 | Wilson et al. | H04B 17/318 |
| 2019/0037495 | A1* | 1/2019 | Wilson et al. | H04W 52/0229 |
| 2019/0081740 | A1* | 3/2019 | Kaikkonen | H04B 7/00 |
| 2019/0097874 | A1* | 3/2019 | Zhou | H04B 7/06966 |
| 2019/0158205 | A1 | 5/2019 | Sheng et al. | |
| 2019/0208436 | A1* | 7/2019 | Zhou | H04L 27/2692 |
| 2019/0297547 | A1* | 9/2019 | Tsai | H04W 36/0077 |
| 2019/0334687 | A1* | 10/2019 | Su | H04L 5/0053 |
| 2020/0022108 | A1* | 1/2020 | Chen | H04W 68/02 |
| 2020/0092814 | A1* | 3/2020 | Zhou | H04W 52/0235 |
| 2020/0092833 | A1* | 3/2020 | Agiwal | H04W 72/23 |
| 2020/0120584 | A1* | 4/2020 | Yi | H04W 48/16 |
| 2020/0154450 | A1* | 5/2020 | Zhou | H04L 5/0023 |
| 2020/0245333 | A1* | 7/2020 | Lin | H04L 5/0094 |
| 2020/0260500 | A1* | 8/2020 | Agiwal | H04W 28/0278 |
| 2020/0404525 | A1* | 12/2020 | Rahman | H04L 5/0091 |
| 2021/0013951 | A1* | 1/2021 | Chen | H04W 76/19 |
| 2021/0037500 | A1* | 2/2021 | Liu | H04W 76/11 |
| 2021/0068055 | A1* | 3/2021 | Nam | H04L 5/0091 |
| 2021/0160126 | A1* | 5/2021 | Cirik | H04W 52/0241 |
| 2021/0185609 | A1* | 6/2021 | Zhou | H04W 52/0206 |
| 2021/0235469 | A1* | 7/2021 | Mu | H04W 52/0216 |
| 2021/0243659 | A1* | 8/2021 | Cirik | H04L 5/0048 |
| 2021/0266831 | A1* | 8/2021 | Zhou | H04W 72/51 |
| 2022/0201713 | A1* | 6/2022 | Beale | H04L 5/0053 |
| 2023/0076897 | A1* | 3/2023 | Svedman | H04L 5/0053 |
| 2023/0300835 | A1* | 9/2023 | Muruganathan | H04B 7/06968 370/329 |

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Multiplexing and channel coding (Release 16)", 3GPP TS 38.212, V16.1.0, Mar. 2020, pp. 1-101.

Office action received for corresponding European Patent Application No. 20757270.2, dated Jul. 28, 2025, 3 pages.

Oppo, "Enhancements on multi-TRP and multi-panel transmission," 3GPP TSG RAN WG1 Meeting #99, R1-1911843, Reno, USA, Nov. 18-22, 2019.

Oppo, "Enhancements on beam management for multi-TRP," 3GPP TSG RAN WG1 #102-e, R1-2005986, Aug. 17-28, 2020.

* cited by examiner

400

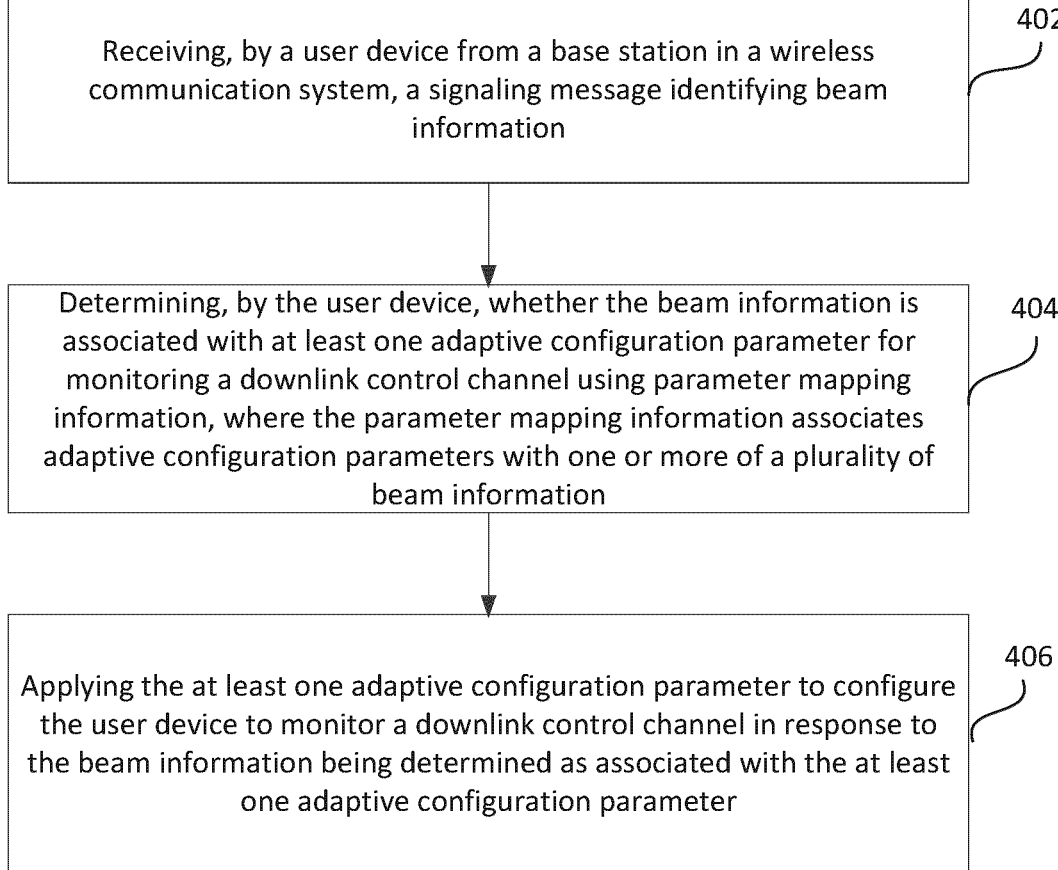

402

Receiving, by a user device from a base station in a wireless communication system, a signaling message identifying beam information

404

Determining, by the user device, whether the beam information is associated with at least one adaptive configuration parameter for monitoring a downlink control channel using parameter mapping information, where the parameter mapping information associates adaptive configuration parameters with one or more of a plurality of beam information

406

Applying the at least one adaptive configuration parameter to configure the user device to monitor a downlink control channel in response to the beam information being determined as associated with the at least one adaptive configuration parameter

FIG. 4

ADAPTIVE CONFIGURATION FOR MONITORING A DOWNLINK CONTROL CHANNEL

CROSS REFERENCE TO RELATED APPLICATION

This patent application is a U.S. National Stage application of International Patent Application Number PCT/EP2020/072685 filed Aug. 12, 2020, which is hereby incorporated by reference in its entirety.

TECHNICAL FIELD

This description relates to communications, and in particular, to use of beam information to determine one or more adaptive configuration parameters for monitoring a downlink control channel.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UEs). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services.

An NR communication network may support group downlink control channels (e.g., group common physical downlink control channels (GC-PDCCHs)), where a group downlink control channel provides control information (e.g., downlink control information (DCI)) from a base station to a group of user devices. For example, the user devices within a group may monitor one or more radio network temporary identifiers (RNTIs) associated with the group downlink control channel. In some examples, the group downlink control channel or group downlink channel may refer to provision of downlink control information to group of users by means of group DCI (downlink control information) format. Group DCI format may be used to provide control information for one or more user devices. In some examples, when the group is changed (e.g., a new user device is added or an existing user device is removed), the user devices (e.g., all of the user devices) that are monitoring the group control channel's RNTI(s) may have to be reconfigured, which can increase the amount of radio resource control (RRC) signaling to execute these reconfigurations. In some examples, RRC signaling may use one or more high level layers to identify the configuration parameters, which can be computationally expensive.

Furthermore, in some examples, the group downlink control channels may be beam or downlink reference signal specific, e.g., one group downlink control channel is associated with a particular beam, and another group downlink control channel is associated with another beam. However, the use of beam-specific group downlink control channels may result in relatively large RRC overhead. For example, each time a user device changes its beam, the user device may need to be reconfigured to monitor a different downlink control channel (e.g., which may include changing the RNTI(s) and/or a full reconfiguration), which can increase the amount of RRC resources to perform these reconfigurations. In some examples, a beam may refer to a downlink reference signal, or a beam may be identified based on the downlink reference signal.

SUMMARY

According to an aspect, a method for configuring user devices to monitor a downlink control channel includes receiving, by a user device from a base station in a wireless communication system, a signaling message identifying beam information, and determining, by the user device, whether the beam information is associated with at least one adaptive configuration parameter for monitoring a downlink control channel using parameter mapping information, where the parameter mapping information associates adaptive configuration parameters with one or more of a plurality of beam information. The method includes applying the at least one adaptive configuration parameter to configure the user device to monitor a downlink control channel in response to the beam information being determined as associated with the at least one adaptive configuration parameter.

According to some aspects, the method (or a system or computer-readable medium) may include one or more of the following features (or any combination thereof). The beam information of the signaling message may identify a transmission configuration indicator (TCI) state for a control resource set. The parameter mapping information may associate one or more adaptive configuration parameters with a plurality of TCI states. The beam information of the signaling message may identify a downlink reference signal. The parameter mapping information may associate one or more adaptive configuration parameters with a plurality of downlink reference signals. The beam information of the signaling message may identify a quasi-colocation (QCL) source. The parameter mapping information may associate one or more adaptive configuration parameters with a plurality of QCL sources. The downlink control channel may include a group downlink control channel. The method may further include monitoring the downlink control channel with one or more existing configuration parameters in response to the beam information being determined as not associated with the at least one adaptive configuration parameter.

The method may include ceasing to monitor the downlink control channel in response to the beam information being determined as not associated with the at least one adaptive configuration parameter. The method may include determining whether the beam information is associated with at least one default configuration parameter in response to the beam information being determined as not associated with the at least one adaptive configuration parameter, applying the at least one default configuration parameter in response to the beam information being determined as associated with the at least one default configuration parameter, and maintaining one or more existing configuration parameters in response to the beam information being determined as not associated with the at least one default configuration parameter. The method may include monitoring, by the user device, the downlink control channel after a period of time from a time when a change to the beam information is activated. The at least one adaptive configuration parameter may include a radio network temporary identifier (RNTI).

The at least one adaptive configuration parameter may include at least one of a size of a downlink control information (DCI) format, a starting bit position for device-specific information within the DCI format, a payload size of the device-specific information, or a radio network temporary identifier (RNTI) value used for monitoring the DCI format. The starting bit position may be determined based on a modulo operation using the beam information, an identifier for the user device, and the size of the DCI format. The at least one adaptive configuration parameter may include at least one of a bit position for a wake-up indicator, a size of a downlink control information (DCI) format, or a power-saving radio network temporary identifier (PS-RNTI) value used for monitoring the DCI format. The signaling message may be a medium access control (MAC) control element (CE) (MAC-CE) message. The user device may define a plurality of control resource sets including a first control resource set for a first search space and a second control resource set for a second search space.

The method may include selecting the second control resource set as a primary resource set, determining that the at least one adaptive configuration parameter is associated with the second control resource set based on the parameter mapping information, and updating the first control resource set and the second control resource set with the at least one adaptive configuration parameter to monitor the downlink control channel within the first search space and the second search space. The user device defines a plurality of control resource sets including a first control resource set for a first search space and a second control resource set for a second search space. The method may include determining that the beam information included within the signaling message relates to the second control resource set, determining that the at least one adaptive configuration parameter is associated with the second control resource set based on the parameter mapping information, and updating the first control resource set and the second control resource set with the at least one adaptive configuration parameter to monitor the downlink control channel within the first search space and the second search space.

According to some aspects, a non-transitory computer-readable storage medium is provided that includes instructions stored thereon that, when executed by at least one processor, are configured to cause a computing system to perform any of the above features. In some examples, an apparatus is provided that includes at least one processor, and at least one memory including computer program code. The at least one memory and the computer program code are configured to, with the at least one processor, cause the apparatus at least to perform any of the above features. In some examples, an apparatus is provided that includes means for performing the method.

The details of one or more examples of implementations are set forth in the accompanying drawings and the description below. Other features will be apparent from the description and drawings, and from the claims.

BRIEF DESCRIPTION OF THE DRAWINGS

FIG. 4 illustrates a flowchart depicting example operations of determining adaptive configuration parameters for a downlink control channel according to an aspect.

DETAILED DESCRIPTION

Figure 1:
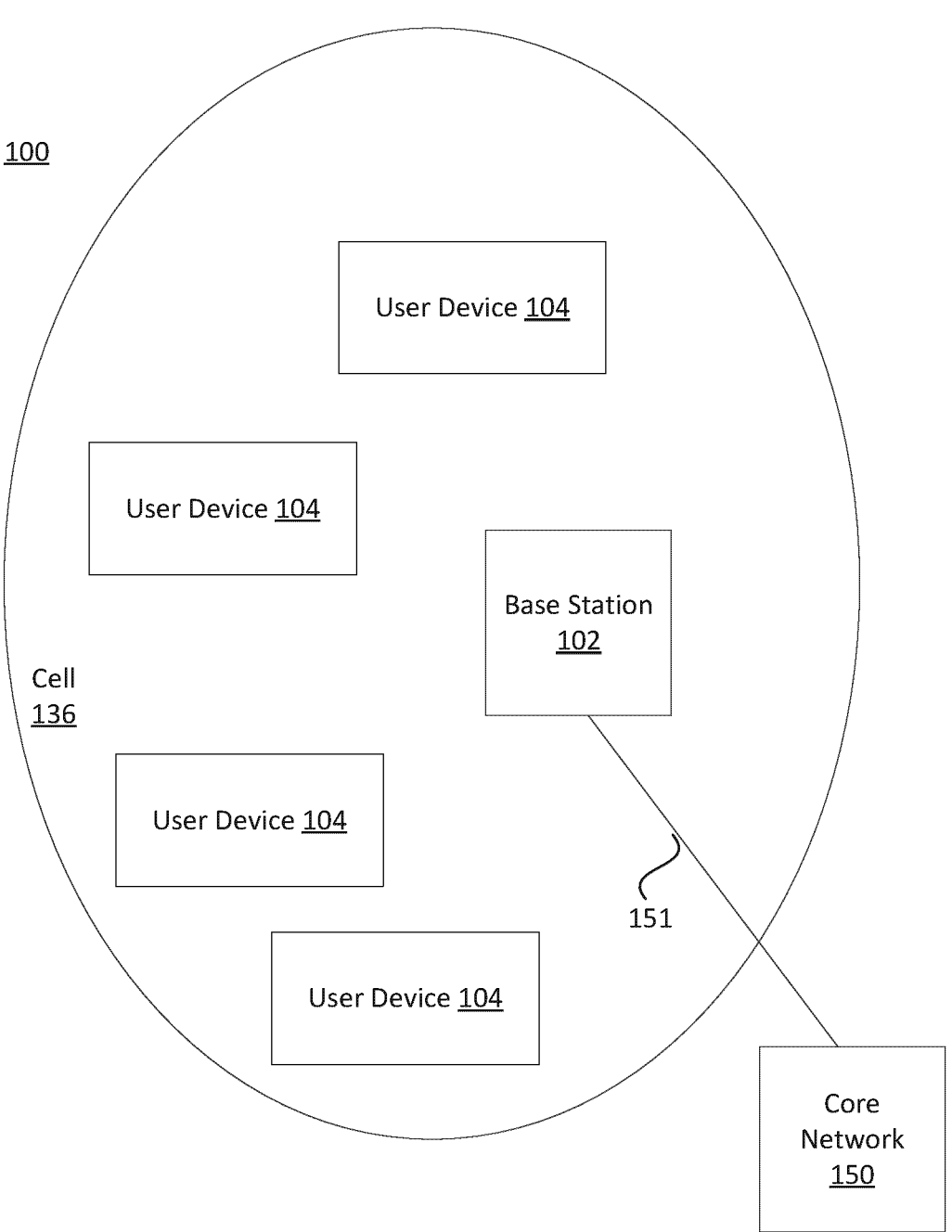
FIG. 1 illustrates a wireless communication system according to an aspect.

This disclosure relates to the configuration of a user device to monitor a downlink control channel (e.g., a group downlink control channel (e.g., GC-PDCCH) and/or a group DCI format) with one or more adaptive configuration parameters, where the adaptive configuration parameters are determined at the user device based on beam information (or changes to the beam information). For example, if a user device receives a change to beam information (e.g., it moved to a different area within a cell or a different cell), the user device may obtain one or more adaptive configuration parameters that are associated with the new beam information and use these adaptive configuration parameters to monitor a downlink control channel (e.g., a group downlink control channel (e.g., GC-PDCCH)). In this manner, the user device may be configured to monitor a downlink control channel such that radio resource control (RRC) signaling that otherwise would be used to perform the configuration may be minimized or avoided. In addition, latency of adaptation may be reduced (e.g., significantly reduced).

The adaptive configuration parameters may include one or more configuration parameters that enable the user device to monitor the downlink control channel. In some examples, the adaptive configuration parameters may include one or more radio network temporary identifiers (RNTIs), a format size of downlink control information (DCI) to be transmitted to user devices associated with the downlink control channel, a search space in which downlink control channel is monitored, a starting bit position for device-specific information within the DCI message, bit width/block size of the device-specific information within the DCI message, down-link message/payload size, and/or an RNTI value(s) used for monitoring the DCI format(s). In some examples, the adaptive configuration parameters may include one or more parameters used for wake-up/power-saving signaling (e.g., DCI with cyclic redundancy check (CRC) scrambled by a power-saving RNTI (PS-RNTI)). For example, the adaptive configuration parameters may include a bit position for a block carrying a wake-up indication, block size (in bits), DCI format size (e.g., DCI format 2-6 size), and/or a PS-RNTI value for scrambling the CRC of the DCI format 2-6.

In further detail, the user device may receive a signaling message that identifies beam information (or a change to the beam information). In some examples, the beam information identifies a transmission configuration indicator (TCI) state. For example, the signaling message may indicate a particular TCI state to be activated for a control resource set (e.g., a CORESET) by the user device. The user device may determine whether the TCI state (e.g., the TCI state index) is associated with one or more adaptive configuration parameters using parameter mapping information, where the parameter mapping information may associate (e.g., link) adaptive configuration parameters with one or more of TCI states that may be a subset of TCI states configured to the user device. In any of the examples, the parameter mapping information may be associated with TCI states for a physical downlink control channel (PDCCH) or a physical downlink shared channel (PDSCH). For example, the parameter mapping information may associate adaptive configuration parameter(s) with a first TCI state, adaptive configuration parameter(s) with a second TCI state, adaptive configuration parameter(s) with a third TCI state, and so forth. If the signaling message indicates the second TCI state, the user device may identify the adaptive configuration parameter(s) that correspond to the second TCI state from the parameter mapping information and use the second TCI state's adaptive configuration parameter(s) to configure the user device to monitor a downlink control channel.

Then, at a subsequent time, when the user device receives another signaling message that changes the TCI state from the second TCI state to the first TCI state, the user device may identify the adaptive configuration parameter(s) that correspond to the first TCI state and use the first TCI state's adaptive configuration parameter(s) to configure the user device to monitor a downlink control channel (which may be different from the one associated with the second TCI state).

In some examples, as discussed above, the parameter mapping information (and, therefore, the parameters for the downlink control channel) are TCI state specific. However, in some examples, the parameter mapping information (and, therefore, the parameters for the downlink control channel) are downlink reference signal (DL-RS) specific. In some examples, the DL-RS is the downlink reference signal indicated by the TCI state (e.g., from the TCI table stored at the user device). In some examples, the parameter mapping information (and, therefore, the parameters for the downlink control channel) are quasi-colocation (QCL) source specific. In some examples, the QCL source is the source of the DL-RS indicated by the TCI state in the TCI table. In some examples, the DL-RS is the downlink reference signal of a certain QCL type, e.g., type D, indicated by the TCI state. As an example, the TCI state may include one or more DL-RSs providing different QCL types (e.g., TypeD and TypeA), and the parameter mapping information may be determined based on the DL-RS providing the specific QCL type. As a further example, QCL types may be identified as TypeA, TypeB, TypeC or TypeD (for example). These and other features are further described with reference to the figures.

FIG. 1 is a block diagram of a wireless communication system 100 according to an aspect. The wireless communication system 100 includes a base station 102 configured to be connected to a plurality of user devices 104. The base station 102 provides wireless coverage within a cell 136, including to the user devices 104. Although four user devices 104 are shown as being connected or attached to the base station 102, any number of user devices 104 may be provided. The base station 102 is also connected to a core network 150 via an interface 151. In some examples, the interface 151 may be an S1 interface or NG interface.

The user devices 104 may also be referred to as mobile stations or user equipments. The base station 102 may also be referred to as an access point (AP), an enhanced Node B (eNB), a base station, next generation Node B (gNB), a next generation enhanced Node B (ng-eNB), or a network node. The terms user device and user equipment may be used interchangeably. A base station 102 may also include or may be referred to as a radio access network (RAN) node, and may include a portion of a base station or a portion of a RAN node (e.g., such as a centralized unit (CU) and/or a distributed unit (DU) in the case of a split base station). At least part of the functionalities of a base station 102 may also be carried out by any node, server or host which may be operably coupled to a transceiver, such as a remote radio head.

In some examples, a base station (BS) node (e.g., the base station 102) may be part of a mobile telecommunication system. A RAN (radio access network) may include one or more BSs or RAN nodes that implement a radio access technology, e.g., to allow one or more user devices 104 to have access to a network or the core network 150. Thus, for example, the RAN (RAN nodes, such as BSs or gNBs) may reside between one or more user devices 104 and a core network 150. In some examples, each RAN node (e.g., BS, eNB, gNB, CU/DU, etc.) or BS may provide one or more wireless communication services for one or more user devices 104, e.g., to allow the user devices 104 to have wireless access to a network, via the RAN node. Each RAN node or BS may perform or provide wireless communication services, e.g., such as allowing the user devices 104 to establish a wireless connection to the RAN node and sending data to and/or receiving data from one or more of the user devices 104. For example, after establishing a connection to a user device 104, a RAN node (e.g., BS, eNB, gNB, CU/DU, etc.) may forward data to the user device 104 that is received from a network or the core network 150, and/or forward data received from the user device 104 to the network or core network 150. RAN nodes (e.g., BS, eNB, gNB, CU/DU, etc.) may perform a wide variety of other wireless functions or services, e.g., such as broadcasting control information (e.g., such as system information) to the user devices 104, paging the user devices 104 when there is data to be delivered to the user device 104, assisting in handover of a user device 104 between cells, scheduling of resources for uplink data transmission from the user device(s) 104 and downlink data transmission to the user device(s) 104, sending control information to configure one or more user devices 104, and the like. These are a few examples of one or more functions that a RAN node or BS may perform. A base station 102 may also be a DU (Distributed Unit) part of an IAB (Integrated Access and Back-haul) node (a.k.a., a relay node). The DU facilitates the access link connection(s) for an IAB node.

A user device 104 (e.g., user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device 104 may also be (or may include) a nearly exclusive uplink only device, of which an example is a camera or video camera loading images or video clips to a network. A user device 104 may be also MT (Mobile Termination) part of IAB (Integrated Access and Backhaul) node (a.k.a., a relay node). MT facilitates the backhaul connection for an IAB node.

In LTE (as an illustrative example), the core network 150 may be referred to as Evolved Packet Core (EPC), which may include a mobility management entity (MME) which may handle or assist with mobility/handover of user devices between base stations 102, one or more gateways that may forward data and control signals between the base stations 102 and packet data networks or the Internet, and other control functions or blocks. Other types of wireless networks, such as 5G (which may be referred to as New Radio (NR)) may also include a core network 150.

In addition, by way of illustrative example, the various example embodiments or techniques described herein may be applied to various types of user devices or data service types or may apply to user devices 104 that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

FIGS. 2A through 2H illustrates a wireless communication system 200 for determining one or more adaptive configuration parameters 222 to monitor a downlink control channel 206 (e.g., a group downlink control channel (e.g., GC-PDCCH)), where the adaptive configuration parameters 222 are determined at the user device 204 based on beam information 210 (or changes to the beam information 210). For example, if a user device 204 receives a change to the beam information 210 (e.g., it moved to a different area within a cell or a different cell), the user device 204 may obtain one or more adaptive configuration parameters 222 that are associated with the new beam information and use these adaptive configuration parameters 222 to monitor a downlink control channel 206. In this manner, the user device 204 may be configured to monitor a downlink control channel such that radio resource control (RRC) signaling that otherwise would be used to perform the configuration may be minimized or avoided and latency of adaptation may be reduced (e.g., significantly reduced).

The wireless communication system 200 may include one or more base stations 202 and a plurality of user devices 204. The wireless communication system 200 may be an example of the wireless communication system 100 of FIG. 1 and may include any of the details discussed with reference to FIG. 1. For example, the base station(s) 202 and the user device 204 may be examples of the base station 102 of FIG. 1 and the user device 104 of FIG. 1, respectively, and may include any of the details discussed with reference to those figures.

The wireless communication system 200 may enable the user devices 204 to connect to and monitor one or more downlink control channels 206. In some examples, the downlink control channels 206 are group common physical downlink control channels (GC-PDCCHs). In some examples, a downlink control channel 206 may refer to a channel (e.g., a dedicated control channel (e.g., a physical downlink control channel (PDCCH)) or separated designed channel) that carries information intended for a group 203 of user devices 204. In some examples, the downlink control channels 206 are distinguished by radio network temporary identifiers (RNTIs) and/or transmit beams (e.g., where each downlink control channel 206 is associated with a unique RNTI and/or transmit beam).

Figure 2A:
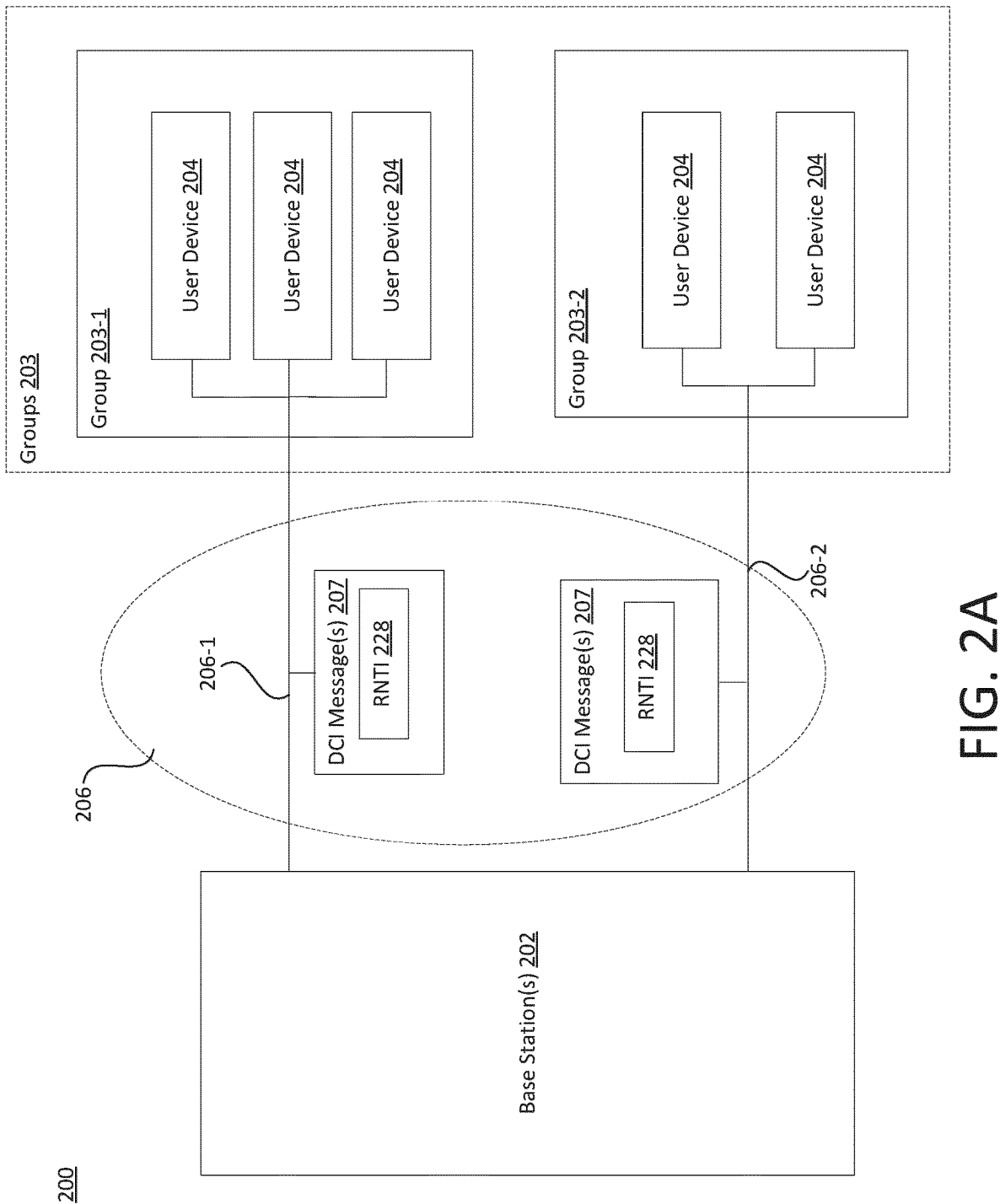
FIG. 2A illustrates a wireless communication system with downlink control channels according to an aspect.

The base station 202 can transmit control information (e.g., downlink control information (DCI)) to a group 203 of user devices 204 via a particular downlink control channel 206, where a group 203 can include two or more user devices 204. As shown in FIG. 2A, the wireless communication system 200 can include a first group 203-1 of user devices 204 configured to receive DCI messages 207 from a base station 202 via a first downlink control channel 206-1, and a second group 203-2 of user devices 204 configured to receive DCI messages 207 from a base station 202 via a second downlink control channel 206-2. Although two downlink control channels 206 are illustrated in FIG. 2A, the wireless communication system 200 may include any number of downlink control channels 206 servicing any number of groups 203. In some examples, the first downlink control channel 206-1 is associated with a first RNTI (and/or a first beam configuration), and the second downlink control channel 206-2 is associated with a second RNTI (and/or a second beam configuration), where the first RNTI (and/or first beam configuration) is different from the second RNTI (and/or second beam configuration).

When a user device 204 is configured to monitor the first downlink control channel 206-1, the user device 204 is considered a part of the first group 203-1 and configured to monitor and receive DCI messages 207 from the base station 202 via the first downlink control channel 206-1 (which are also intended for other user devices 204 within the first group 203-1). Similarly, when a user device 204 is configured to monitor the second downlink control channel 206-2, the user device 204 is considered a part of the second group 203-2 and configured to monitor and receive DCI messages 207 from the base station 202 via the second downlink control channel 206-2 (which are also intended for other user devices 204 within the second group 203-2).

A DCI message 207 with a certain a DCI format may be transmitted on PDCCH with CRC scrambled by a certain RNTI 228 that is used by the user device 204 to monitor the DCI message 207 on a particular downlink control channel 206-1. A DCI message 207 may include control information that is intended to the user devices 204 of a group 203. In some examples, a DCI message 207 may include device-specific information for the user devices 204 that are included within the group 203. For example, the DCI message 207 may have a format size that is sufficiently large to include device-specific information for all of the user devices 204 within a particular group 203. For example, with respect to the first group 203-1, a DCI message 207 may include device-specific information for a first user device, device-specific information for a second user device, and device-specific information for a third user device, and so forth. In other words, a subset of the full DCI information bits are indicated to contain information specifically for a given user device 204. The device specific information may be any type of control information that is specific to a particular user device 204. In some examples, the device specific information may be slot format indicators, pre-emption indicators, power control command indicators, wake-up signaling indicator, etc.

Figure 2B:
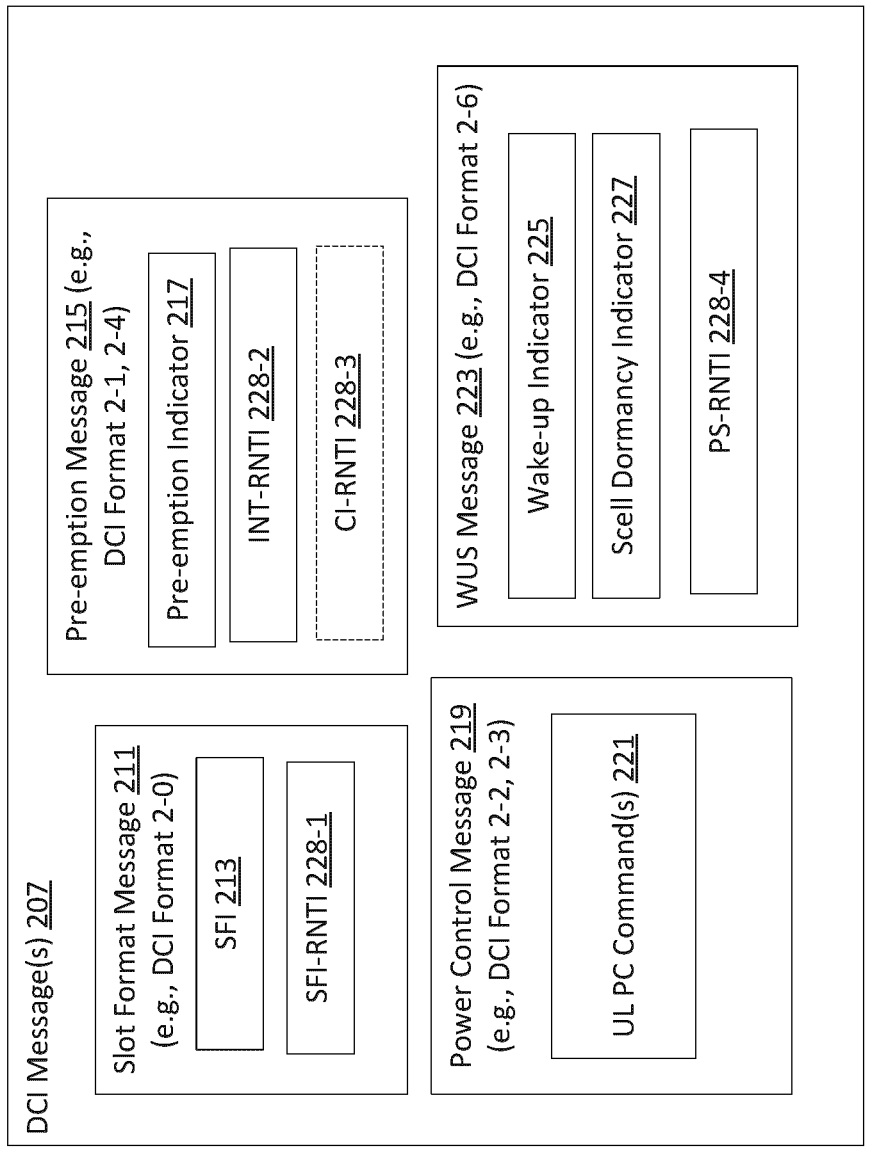
FIG. 2B illustrates examples of downlink control information (DCI) messages according to an aspect.

FIG. 2B illustrates various examples of particular types of DCI messages 207. However, it is noted that the techniques described herein may apply to any type of control message. In some examples, the DCI messages 207 includes a slot format message 211 and may also contain channel occupancy duration, search-space group switching trigger, and/or resource block set availability indicator. The slot format message 211 may specify a slot format indicator 213. The slot format indicator 213 is used to signal the (dynamic) slot format for the user devices 204. In some examples, the slot format indicator 213 has a DCI format (e.g., DCI format 2-0) with a cyclic redundancy check (CRC) scrambled by a slot format indication RNTI (SFI-RNTI) 228-1. The SFI-RNTI 228-1 may be a particular type of RNTI 228.

In some examples, the DCI messages 207 include a pre-emption message 215. The pre-emption message 215 may specify a pre-emption indicator 217. The pre-emption indicator 217 is used to inform the user device 204 that the preceding transmission on certain downlink resources was not executed as intended or scheduled or that the scheduled uplink transmission should not be executed. In some examples, the pre-emption message 215 has a DCI format (e.g., DCI format 2-1) with a CRC scrambled by an interruption RNTI (INT-RNTI) 228-2. The INT-RNTI 228-1 may be a particular type of RNTI 228. In some examples, the pre-emption message 215 has a DCI format (e.g., DCI format 2-4) with a CRC scrambled by a configuration indicator RNTI (CI-RNTI) 228-3. The CI-RNTI 228-3 may be a particular type of RNTI 228.

In some examples, the DCI messages 207 include a power control message 219. The power control message 219 may indicate one or more uplink power control commands 221. In some examples, the power control message 219 has a DCI format (e.g., DCI format 2-2, DCI format 2-3). In some examples, the uplink power control commands 221 are for one or more uplink control (or shared) channels (or other power components) such as a physical uplink control channel (PUCCH), a physical uplink shared channel (PUSCH), and sounding reference signal (SRS), etc. The power control message 219 may be associated with one or more RNTIs 228.

In some examples, the DCI messages 207 includes a wake-up signaling (WUS) message 223, which may be used for power consumption control. The WUS message 223 may include a wake-up indicator 225 and a secondary cell (Scell) dormancy indicator 227. The wake-up indicator 225 (e.g., 1 bit) may indicate whether or a particular user device 204 should be activated. In some examples, the wake-up indicator 225 may include one or more wake-up indicators to monitor a PDCCH, start a discontinuous reception (DRX) on-duration timer (e.g., drx-onDurationTimer), perform channel status information (CS) reporting such as reference signal received power (RSRP) reporting (e.g., L1-RSRP reporting) and/or channel quality indicator (CQI) reporting, and/or activate a dormant or non-dormant bandwidth part (BWP) for one or more SCells. In some examples, upon activation, the user device 204 is configured to start the DRX on-duration timer for the next on-duration. In some examples, the WUS message 223 is referred to as a DCP message in 3GPP (e.g., DCI with a CRC scrambled by a power-saving RNTI (PS-RNTI) 228-4). The DCI format for the WUS message 223 may be referred to as DCI format 2-6. Generally, the WUS message 223 is designed to allow the user device 204 to skip monitoring (e.g., PDCCH monitoring) in on-duration when there is no data transmission to be performed. For example, if the base station 202 intends to schedule the user device 204, the base station 202 transmits the WUS message 223 to the user device 204 during the wake-up signaling occasion(s) to start the DRX on-duration timer for the user device 204. Then, the user device 204 will monitor normal PDCCH for scheduling data at the coming on-duration.

In order to monitor the various information transmitted on a downlink control channel 206, the user devices 204 are required to be configured with configuration parameters. For example, a user device 204 may need to be informed on the particular RNTI(s) 228 (e.g., which may include the SFI-RNTI 228-1, INT-RNTI 228-2, CI-RNTI 228-3, PS-RNTI 228-4, etc.), the DCI format size 241 of the DCI message 207, the starting bit position 243 (e.g., which may include the WUI bit position 240) that indicates a location of where a user device 204 looks for its device-specific information, and/or the payload size 245.

In some examples, when the group 203 is changed (e.g., a new user device 204 is added or an existing user device 204 is removed), all the user devices 204 that are monitoring the control channel's RNTI(s) 228 may have to be reconfigured, which can increase the amount of radio resource control (RRC) resources to execute these reconfigurations. For example, in some examples, when the group 203 is changed, RRC resources are used to reconfigure the configuration parameters (e.g., DCI format size 241, the starting bit position 243, and/or the payload size 245). Furthermore, in some examples, the downlink control channels 206 may be beam specific, e.g., one downlink control channel 206 is associated with a particular beam, and another downlink control channel 206 is associated with another beam. However, the use of beam-specific downlink control channels 206 may result in relatively large RRC overhead. For example, each time a user device 204 changes its beam, the user device 204 may need to be reconfigured to monitor a different downlink control channel 206 (e.g., which may include changing the RNTI(s) 228 and/or a full reconfiguration), which can increase the amount of RRC resources to perform these reconfigurations.

However, when the beam information 210 is changed, a user device 204 may automatically reconfigure its configuration parameters to monitor (or continue to monitor) a downlink control channel 206 (e.g., GC-PDCCH). For example, the wireless communication system 200 enables the configuration of a user device 204 to monitor a downlink control channel 206 (e.g., a group downlink control channel (e.g., GC-PDCCH) with one or more adaptive configuration parameters 222, where the adaptive configuration parameters 222 are determined at the user device 204 based on beam information 210 (or changes to the beam information 210). For example, if a user device 204 receives a change to beam information 210 (e.g., it moved to a different area within a cell or a different cell), the user device 204 may obtain one or more adaptive configuration parameters 222 that are associated with the new beam information 210 and use these adaptive configuration parameters 222 to monitor a downlink control channel 206 such as a GC-PDCCH. In this manner, the user device 204 may be configured to monitor the GC-PDCCH such that the RRC signaling that otherwise would be used to perform the configuration may be minimized or avoided.

Figure 2C:
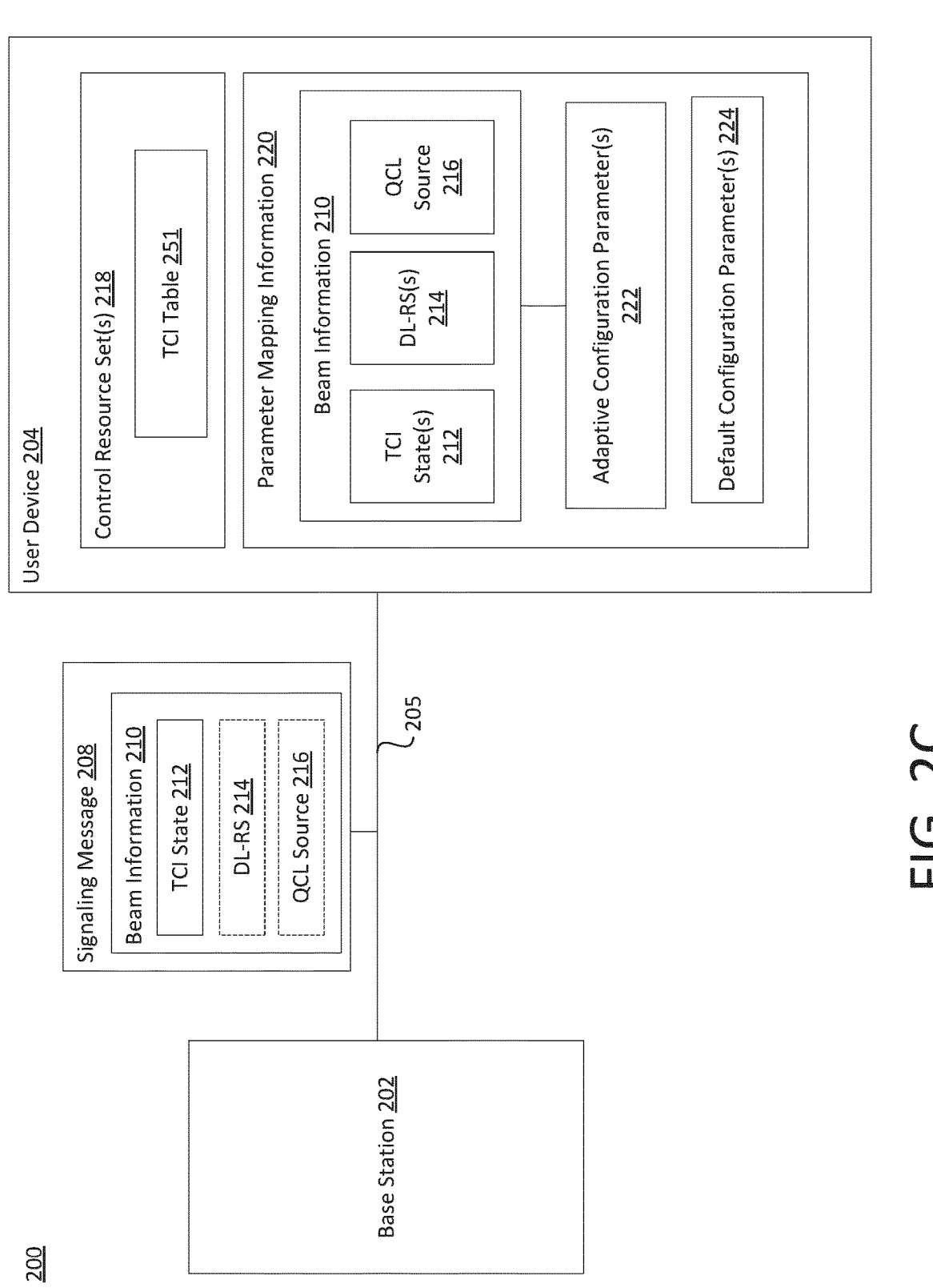
FIG. 2C illustrates a user device for determining adaptive communication parameters based on beam information according to an aspect.
Figure 2D:
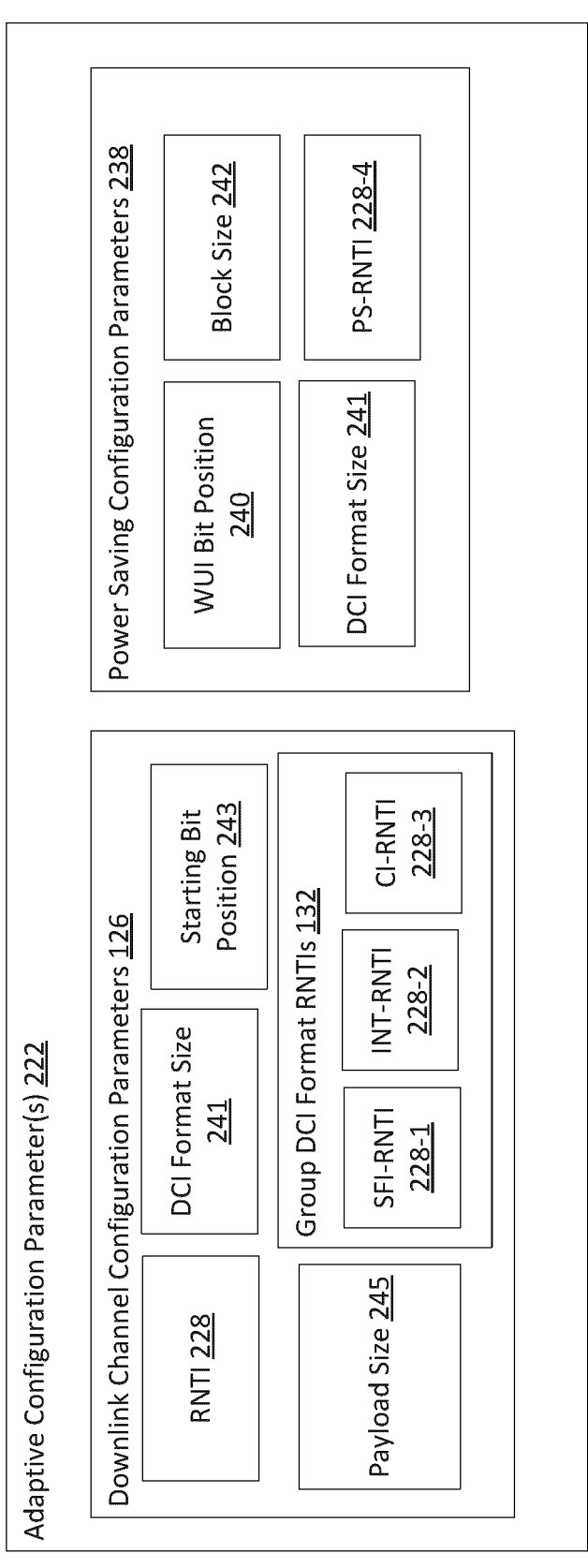
FIG. 2D illustrates examples of adaptive configuration parameters according to an aspect.
Figure 2E:
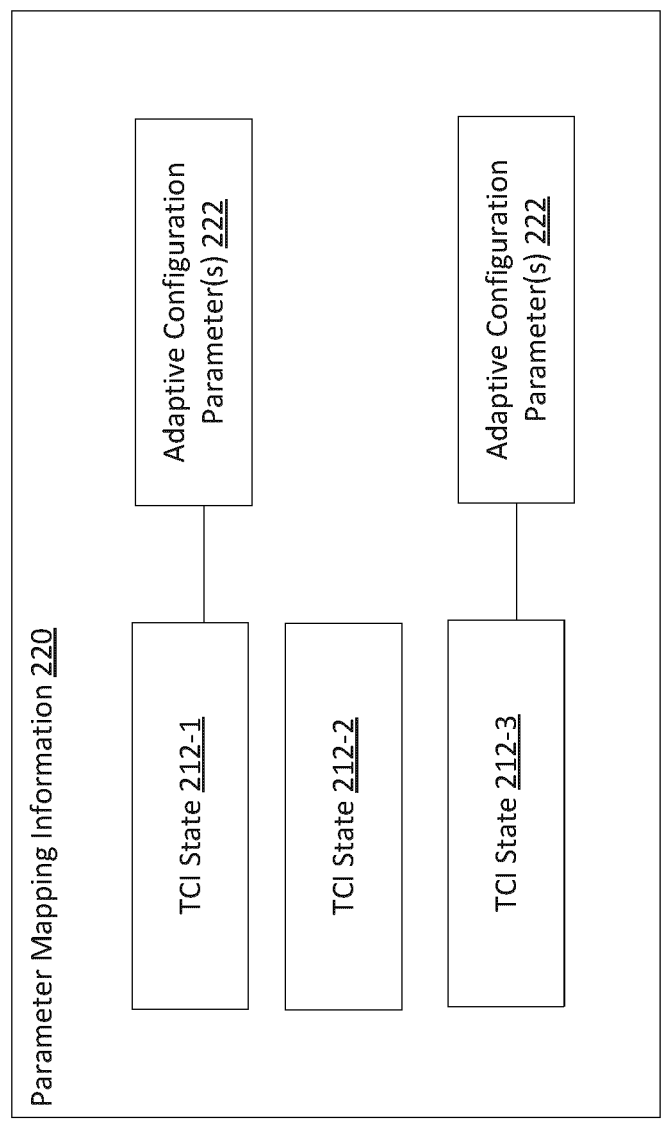
FIG. 2E illustrates an example of parameter mapping information that is TCI state specific according to an aspect.
Figure 2F:
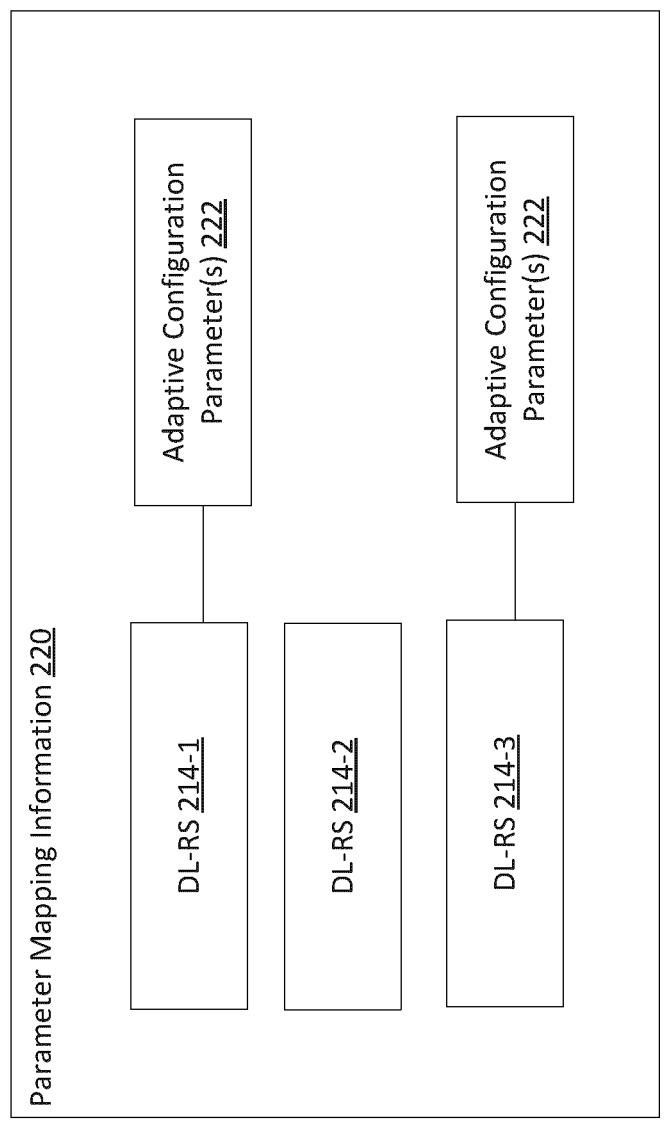
FIG. 2F illustrates another example of parameter mapping information that is downlink reference signal specific according to an aspect.
Figure 2G:
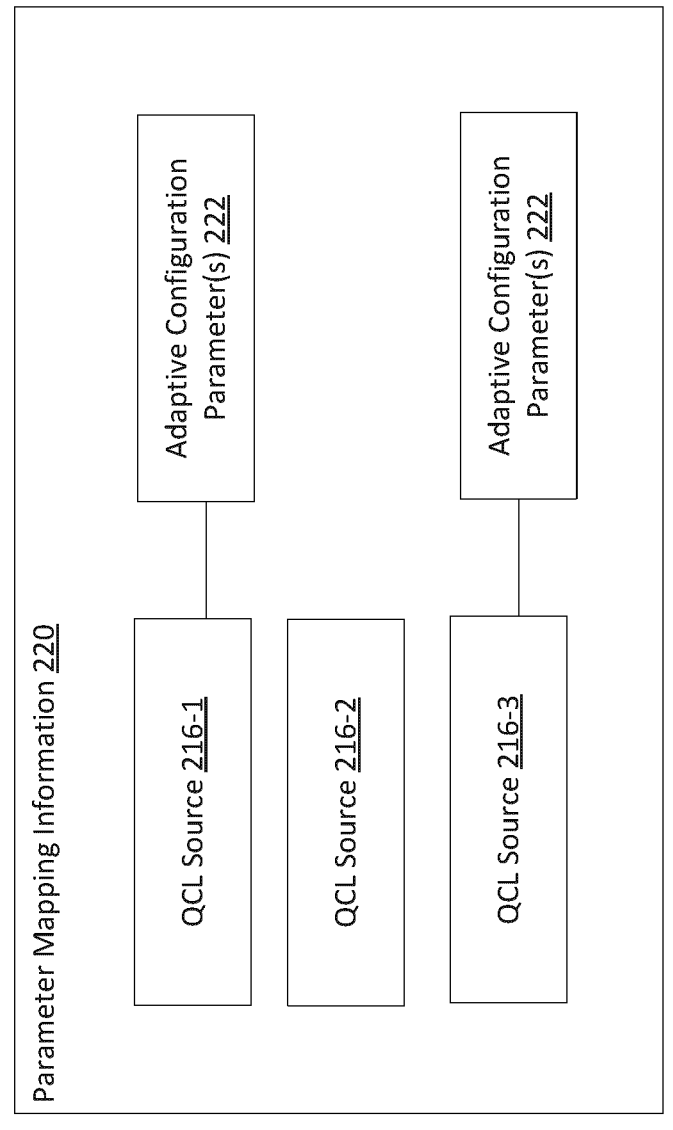
FIG. 2G illustrates another example of parameter mapping information that is QCL source specific according to an aspect.

Referring to FIG. 2D, the adaptive configuration parameters 222 may include one or more configuration parameters that enable the user device to monitor the downlink control channel (e.g., GC-PDCCH). In some examples, the adaptive configuration parameters 222 may include one or more radio network temporary identifiers (RNTIs) 228. For example, the adaptive configuration parameters 222 may include RNTI value(s) used for monitoring the DCI format(s). In some examples, the adaptive configuration parameters 222 include one or more group DCI format RNTIs 132 such as the SFI-RNTI 228-1, the INT-RNTI 228-2, and/or the CI-RNTI 228-3.

In some examples, the adaptive configuration parameters 222 may include a DCI format size 241 associated with a DCI message 207 transmitted via the downlink control channel 206. In some examples, DCI format size is referred to as DCI payload size. In some examples, the DCI format size 241 is the DCI format size of the slot format message 211 (e.g., DCI format 2-0). In some examples, the DCI format size 241 is the DCI format size of the pre-emption message 215 (e.g., DCI format 2-1 or 2-4). In some examples, the DCI format size 241 is the DCI format size of the power control message 219 (e.g., DCI format 2-2, 2-3).

In some examples, the adaptive configuration parameters 222 include a starting bit position 243 for device-specific information within the DCI message 207. For example, if a group 203 associated with a downlink control channel 206 includes a first user device and a second user device. For the first user device 204, the adaptive configuration parameters 222 may include the starting bit position 243 for the first user device. In this manner, the first user device can determine which location in the DCI message 207 includes device-specific information intended for the first user device. In other words, the first user device may monitor the DCI message 207 using the corresponding RNTI 228 and obtain device-specific information for the first user device at the starting bit position 243. The second user device is associated with a different starting bit position 243 and would obtain device-specific information intended for the second user device at its own starting bit position 243. In some examples, the starting bit position 243 may be the starting bit position for the SFI 213. In some examples, the starting bit position 243 may be the starting bit position for the pre-emption indicator 217. In some examples, the starting bit position 243 may be the starting bit position for the UL PC command(s) 221.

In some examples, the adaptive configuration parameters 222 include a payload size 245 of the device-specific information within the DCI message 207. For example, the payload size 245 may be the bit width or the block size (e.g., number of bits) of the device-specific information within the DCI message before channel coding, such as polar coding. In some examples, the payload size 245 may be the payload size for the DCI carrying the SFI 213, the pre-emption indicator 217, the UL PC command(s) 221 and/or other above mentioned DCI fields.

In some examples, the adaptive configuration parameters may include one or more power saving configuration parameters 238. In some examples, the power saving configuration parameters 238 may relate to wake-up/power-saving signaling (e.g., DCI with cyclic redundancy check (CRC) scrambled by a power-saving RNTI (PS-RNTI 228-4)). The power saving configuration parameters 238 may be referred to as DCP parameters or DCP configuration. For example, the power saving configuration parameters 238 may include a WUI bit position 240 for a block carrying the wake-up indicator 225, block size 242 (in bits) for the wake-up indicator 225, DCI format size 241 for the WUS message 223 (e.g., DCI format 2-6 size), and/or a value for PS-RNTI 228-4 for scrambling the CRC of the WUS message 223 (e.g., DCI format 2-6).

Referring to FIG. 2C, the user device 204 may receive a signaling message 208 from the base station 202. In some examples, the signaling message 208 is transmitted via a downlink control channel 205. In some examples, the downlink control channel 205 is the same communication channel as the downlink control channel 206. In some examples, the downlink control channel 205 is different from the downlink control channel 206. For example, the downlink control channel 205 may be a dedicated downlink control channel, and the downlink control channel 206 may be a group downlink control channel (e.g., GC-PDCCH). In some examples, the signaling message 208 is a medium access control (MAC) control element (CE) (e.g., MAC-CE) message.

The signaling message 208 may indicate beam information 210 (or a change to beam information 210) for one or more control resource sets 218 defined at the user device 204. In some examples, the beam information 210 indicates a transmit configuration indicator (TCI) state 212. The beam information 210 may indicate e.g. an active TCI state 212 for a CORESET. In some examples, the TCI state 212 indicates a value associated with a TCI index (e.g., 0, 1, 2, etc.). For example, a first TCI state may be indicated by TCI index 0, a second TCI state may be indicated by TCI index 1, a third TCI state may be indicated by TCI index 2, and so forth.

In some examples, the beam information 210 identifies a downlink reference signal 214 (or a value/index/identifier for the downlink reference signal 214). For example, the beam information 210 specified in the signaling message 208 may include a particular downlink reference signal 214 among a plurality of different downlink reference signals 214. In one example, the beam information 210 specified in the signaling message 208 may include a particular downlink reference signal 214 indicated by the TCI state 212.

In some examples, the beam information 210 includes a quasi-colocation (QCL) source 216 for the downlink reference signal 214. In some examples, the beam information 210 includes QCL source 216 for the downlink reference signal 214 indicated by the TCI state 212. For example, the beam information 210 specified in the signaling message 208 may include a particular QCL source 216 for the downlink reference signal 214 among a plurality of different QCL sources 216. QCL sources 216 may be non-zero power channel state information reference signal (CSI-RS) or synchronization signal block (SSB) (e.g., synchronization signal-physical broadcast channel (SS/PBCH) block).

A control resource set 218 defines physical time and frequency resources on which downlink control channel(s) can be transmitted within a search space. In other words, the user device 204 is configured with a control resource set 218 that includes configuration information for the search space set which can be set to common or UE specific. The search space configuration information further includes the configuration of the DCI formats to be monitored on the search space, and each DCI format is associated with one or more RNTI values 228. In some examples, a control resource set 218 is referred to as a CORESET (e.g., the terms control resource set 218 and CORESET may be used interchangeably). In some examples, the user device 204 is configured with a single control resource set 218. In some examples, as further explained later in the disclosure, the user device 204 is configured to multiple control resource sets 218.

In some examples, the control resource set 218 uses a QCL and TCI framework for defining a transmit beam for different downlink physical signals and channels. In some examples, the control resource set 218 includes a TCI table 251 in which each row/state is associated with one or two reference signals (RSs) that act as a source RS(s) in terms of different QCL parameters for a respective downlink reference signal such as a PDCCH demodulation reference signal (DMRS). The QCL parameters may include delay spread, average delay, doppler spread, doppler shift, and/or spatial RX, etc. When a spatial RX QCL parameter is configured for a certain source RS, in some examples, the user device 204 can assume the same RX beam can be applied when receiving the configured/scheduled/triggered physical signal or physical channel as was used for receiving the source RS. Table 1 (below) depicts an example of the TCI table 251.

TABLE 1

| TCI Index (State) | Source RS set | Source RS index | QCL type |
|---|---|---|---|
| 0 | RS set #A | SS/PBCH block#n (of set #a) | A + D |
| 1 | RS set #B | TRS#b (of set #B) | A |
| | | CSI-RS#c (of set #B) | B |
| . . . | . . . | . . . | . . . |
| M − 1 | RS set #E | CSI-RS#b (of the set #E) | A + D |

In some examples, QCL type A refers to Doppler spread, Doppler shift, delay spread, and/or average delay. In some examples, QCL type D refers to spatial RX. When TCI index 0 determines source RS(s) for a certain physical signal or channel, the user device 204 can set its RX beam for receiving the SS/PBCH block #n. Correspondingly, when TCI index 1 determines source RS(s) for a certain physical signal or channel, the UE can set its RX beam for receiving the CSI-RS # (of RS set #B)

For determining the transmit beam for a downlink control channel, a control resource set 218 (or each control resource set 218) may be associated to one or more of the TCI rows (or TCI states) in the TCI table 251. In case the control resource set 218 is associated with more than one TCI state, in some examples, MAC-CE level activation signaling (e.g., the signaling message 208) is used to control that which one of the multiple TCI states is active at a time per control resource set 218. Search space set related parameters associated to the control resource set 218 define time domain monitoring pattern from which the user device 204 knows when to monitor certain control resource set 218 and then from associated (active) TCI state of the control resource set 218, the UE knows how to set its RX beam for purpose of monitoring in that control resource set 218.

According to the embodiment discussed herein, in response to the user device 204 receiving the signaling message 208, the user device 204 may determine whether the beam information 210 identified in the signaling message 208 is associated with one or more adaptive configuration parameters 222 based on parameter mapping information 220. The parameter mapping information 220 may associate adaptive configuration parameters 222 with a plurality of beam information 210, which can be TCI state-specific, downlink reference signal-specific, or QCL source specific. In other words, adaptive configuration parameters 222 (e.g., values for the adaptive configuration parameters 222) are determined based on the TCI state, the downlink reference signal, or the QCL source. For example, values for the RNTI 228, DCI format size 241, starting bit position 243, payload size 245, etc., are dependent upon the type or index/identifier value of TCI state 212, downlink reference signal 214, or QCL source 216.

In some examples, the parameter mapping information 220 (and, therefore, the adaptive configuration parameters 222 for the downlink control channel 206) are TCI state specific. For example, referring to FIG. 2E, the parameter mapping information 220 may associate one or more adaptive configuration parameters 222 with one or more TCI states 212. In some examples, the parameter mapping information 220 may associate (e.g., link) adaptive configuration parameters 222 to one or more the DL-RSs 214 indicated by the TCI states 212, or to one or more DL-RSs 214 or one or more QCL sources 216 of the DL-RS 214 indicated by the TCI state 212, or to one or more DL-RSs 214 of a specific QCL source type indicated by the TCI state 212.

For example, the parameter mapping information 220 may associate adaptive configuration parameter(s) 222 with a first TCI state 212-1, and adaptive configuration parameter(s) 222 with a third TCI state 212-3. In some examples (although not shown in FIG. 2E), the parameter mapping information 220 may associate adaptive configuration parameter(s) 222 with a second TCI state 212-2. Also, although three TCI states are indicated, a control resource set 218 may define any number of TCI states 212 including one TCI state 212 or any number greater than three TCI states 212.

If the signaling message 208 indicates the third TCI state 212-3, the user device 204 may identify the adaptive configuration parameter(s) 222 that correspond to the third TCI state 212-3 from the parameter mapping information 220 and use the third TCI state's adaptive configuration parameter(s) 222 to configure the user device 204 to monitor a downlink control channel 206. For example, in response to the third TCI state 212-3 being determined as associated with the adaptive configuration parameter(s) 222, the user device 204 may apply the third TCI state's adaptive configuration parameter(s) 222 to configure the user device 204 to monitor the downlink control channel 206.

Then, at a subsequent time, when the user device 204 receives another signaling message 208 that changes the TCI state 212 from the third TCI state 212-3 to the first TCI state 212-1, the user device 204 may identify the adaptive configuration parameter(s) 222 that correspond to the first TCI state 212-1 and use the first TCI state's adaptive configuration parameter(s) 222 to configure the user device 204 to monitor a downlink control channel 206 (which may be different from the one associated with the third TCI state 212-3).

In some examples, if the signaling message 208 indicates the second TCI state 212-2, the user device 204 may use the parameter mapping information 220 to determine that the second TCI state 212-2 is not associated with the adaptive configuration parameter(s) 222 (e.g., no adaptive configuration parameters 222 are linked to the second TCI state 212-2). In some examples, in response to the beam information 210 being determined as not associated with the adaptive configuration parameter(s) 222, the user device 204 ceases to monitor the downlink control channel 206 with its current parameters. In some examples, in response to the beam information 210 being determined as not associated with adaptive configuration parameters 222, referring to FIG. 2C, the user device 204 may use default configuration parameter(s) 224 to configure the user device 204 to monitor a downlink control channel 206. In some examples, if the beam information 210 is determined as not associated with the adaptive configuration parameters 222 and/or default configuration parameters 224 do not exist, the user device 204 may use one or more existing configuration parameter(s) to configure the user device 204 to monitor a downlink control channel.

In some examples, if the user device 204 has been configured with adaptive configuration parameters 222 for at least one TCI state 212 and the user device 204 received activation for a new TCI state 212, the user device 204 may determine if the TCI state 212 is associated with adaptive configuration parameters 222. If not, in some examples, the user device 204 is not allowed to continue monitoring the downlink control channel 206 with the current parameters or parameters associated with the previously active TCI state 212. If yes, the user device 204 may apply the new adaptive configuration parameters 222 or continue with the current ones, depending on the configuration of the parameters.

In some examples, the user device 204 is configured with default configuration parameter(s) 224, and, for only specific TCI states 212, the user device 204 determines if the alternative configuration is provided. If an alternative configuration is not provided, the user device 204 monitors the downlink control channel 206 using the default configuration parameter(s) 224 except for the specific TCI state 212 with the alternative configuration. In some examples, the default configuration parameter(s) may be the parameters associated with the lowest TCI state index. In some examples, when the user device 204 receives activation for a new TCI state 212 that is not associated with new/different adaptive configuration parameter(s) 222, the user device 204 is configured to monitor the downlink control channel 206 with the current configuration parameters. In some examples, if the user device 204 has not been configured with any adaptive configuration parameter(s) 222 for any specific TCI state 212, the user device 204 continues to monitor the downlink control channel in baseline operation with the current configuration parameters.

In some examples, the parameter mapping information 220 (and, therefore, the adaptive configuration parameters 222 for the downlink control channel 206) are downlink reference signal (DL-RS) specific. In some examples, the DL-RS is the downlink reference signal indicated by the TCI state (e.g., from the TCI table 251 stored at the user device 204). It is noted that any of the features described with reference to the TCI state-specific example can be applied to DL-RS specific example. For example, referring to FIG. 2F, the parameter mapping information 220 may identify adaptive configuration parameter(s) 222 for a first DL-RS 214-1, and adaptive configuration parameter(s) 222 for a third DL-RS 214-3. In some examples (although not shown in FIG. 2F), the parameter mapping information 220 may associate adaptive configuration parameter(s) 222 with a second DL-RS 214-2. Also, although three DL-RSs 214 are indicated, a control resource set 218 may define any number of DL-RSs 214 including one DL-RS 214 or any number greater than three DL-RSs 214.

If the signaling message 208 indicates the third DL-RS 214-3, the user device 204 may identify the adaptive configuration parameter(s) 222 that correspond to the third DL-RS 214-3 from the parameter mapping information 220 and use the third DL-RS's adaptive configuration parameter(s) 222 to configure the user device 204 to monitor a downlink control channel 206. For example, in response to the third DL-RS 214-3 being determined as associated with the adaptive configuration parameter(s) 222, the user device 204 may apply the third DL-RS's adaptive configuration parameter(s) 222 to configure the user device 204 to monitor the downlink control channel 206.

In some examples, instead of the type of DL-RS being specified in the signaling message 208, the signaling message 208 may indicate a particular TCI state 212, and the user device may determine the type of DL-RS 214 based on the particular TCI state 212 from the TCI table 251 stored at the user device 204. For example, if the TCI table 251 associates the third DL-RS 214-3 with the first TCI state 212-1 (and the signaling message 208 indicates the first TCI state 212-1), the user device 204 may obtain the adaptive configuration parameter(s) 222 associated with the third DL-RS 214-3 from the parameter mapping information 220.

Then, at a subsequent time, when the user device 204 receives another signaling message 208 that changes the beam information 210 (e.g., changes the TCI state and/or changes the DL-RS 214), the user device 204 may identify the adaptive configuration parameter(s) 222 that correspond to the new DL-RS 214 and use these adaptive configuration parameter(s) 222 to configure the user device 204 to monitor a downlink control channel 206 (which may be different from the one associated with the previous beam information 210).

In some examples, if the signaling message 208 indicates the second DL-RS 214-2 (or indicates a particular TCI state 212), the user device 204 may use the parameter mapping information 220 to determine that the second DL-RS 214-2 is not associated with the adaptive configuration parameter(s) 222. In some examples, in response to the beam information 210 being determined as not associated with adaptive configuration parameters 222, referring to FIG. 2C, the user device 204 may use default configuration parameter(s) 224 to configure the user device 204 to monitor a downlink control channel 206. In some examples, if the beam information 210 is determined as not associated with the adaptive configuration parameters 222 and/or default configuration parameters 224 do not exist, the user device 204 may use one or more existing configuration parameter(s) to configure the user device 204 to monitor a downlink control channel.

In some examples, the parameter mapping information 220 (and, therefore, the adaptive configuration parameters 222 for the downlink control channel 206) are QCL source specific. In some examples, the QCL source is the source of the DL-RS 214 indicated by the TCI state 212 in the TCI table 251. It is noted that any of the features described with reference to the TCI state-specific example and/or DL-RS specific example can be applied to the QCL source-specific example. For example, referring to FIG. 2G, the parameter mapping information 220 may identify adaptive configuration parameter(s) 222 for a first QCL source 216-1, and adaptive configuration parameter(s) 222 for a third QCL source 216-3. In some examples (although not shown in FIG. 2G), the parameter mapping information 220 may associate adaptive configuration parameter(s) 222 with a second QCL source 216-2. Also, although three QCL sources 216 are indicated, a control resource set 218 may define any number of QCL sources 216 including one QCL source 216 or any number greater than three QCL sources 216.

If the signaling message 208 indicates the third QCL source 216-3, the user device 204 may identify the adaptive configuration parameter(s) 222 that correspond to the third QCL source 216-3 from the parameter mapping information 220 and use the third QCL source's adaptive configuration parameter(s) 222 to configure the user device 204 to monitor a downlink control channel 206. For example, in response to the third QCL source 216-3 being determined as associated with the adaptive configuration parameter(s) 222, the user device 204 may apply the third QCL source's adaptive configuration parameter(s) 222 to configure the user device 204 to monitor the downlink control channel 206.

In some examples, instead of the type of QCL source 216-3 being specified in the signaling message 208, the signaling message 208 may indicate a particular TCI state 212, and the user device may determine the type of QCL source 216 based on the particular TCI state 212 from the TCI table 251 stored at the user device 204. For example, if the TCI table 251 associates the third QCL source 216-3 with the first DL-RS 214-1 that corresponds to the first TCI state 212-1 (and the signaling message 208 indicates the first TCI state 212-1), the user device 204 may obtain the adaptive configuration parameter(s) 222 associated with the third QCL source 216-3 from the parameter mapping information 220.

Then, at a subsequent time, when the user device 204 receives another signaling message 208 that changes the beam information 210 (e.g., changes the TCI state, changes the DL-RS 214, and/or changes the QCL source 216-3), the user device 204 may identify the adaptive configuration parameter(s) 222 that correspond to the new QCL source 216 and use these adaptive configuration parameter(s) 222 to configure the user device 204 to monitor a downlink control channel 206 (which may be different from the one associated with the previous beam information 210).

In some examples, if the signaling message 208 indicates the second QCL source 216-2 (or indicates a particular DL-RS 214 or TCI state 212), the user device 204 may use the parameter mapping information 220 to determine that the second QCL source 216-2 is not associated with the adaptive configuration parameter(s) 222. In some examples, in response to the beam information 210 being determined as not associated with adaptive configuration parameters 222, referring to FIG. 2C, the user device 204 may use default configuration parameter(s) 224 to configure the user device 204 to monitor a downlink control channel 206. In some examples, if the beam information 210 is determined as not associated with the adaptive configuration parameters 222 and/or default configuration parameters 224 do not exist, the user device 204 may use one or more existing configuration parameter(s) to configure the user device 204 to monitor a downlink control channel.

Figure 2H:
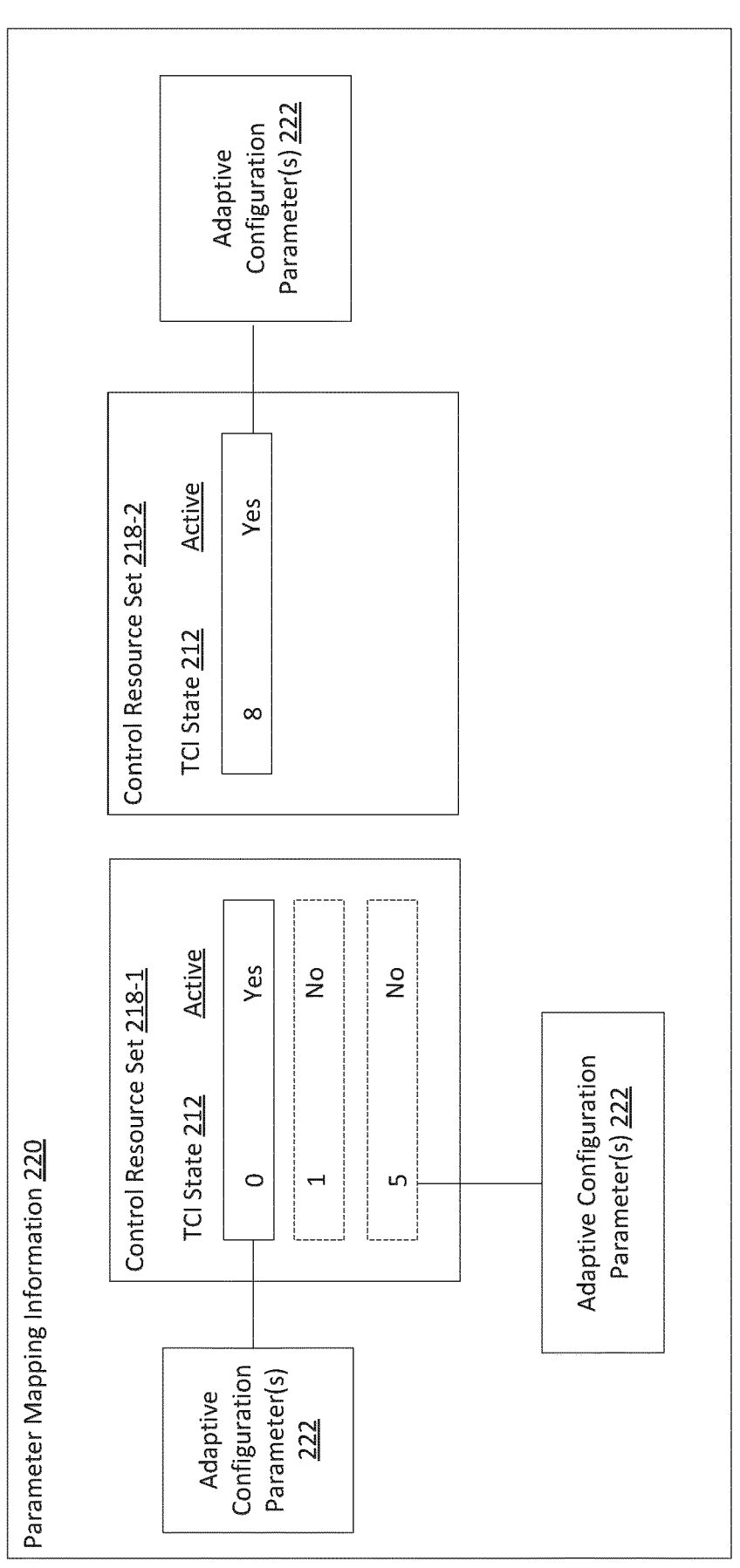
FIG. 2H illustrates another example of parameter mapping information for multiple control sets according to an aspect.

In some examples, the user device 204 defines multiple control resource sets 218. For example, as shown in FIG. 2H, the control resource sets 218 may include a first control resource set 218-1 for a first search space, and a second control resource set 218-2 for a second search space. Although FIG. 2H illustrates two control resource sets 218, the embodiments discussed herein may include any number of control resource sets 218. In some examples, the user device 204 can be configured up to three control resource sets 218. In some examples, the user device 204 can be configured up to five control resource sets 218. As indicated above, a particular control resource set 218 may define the physical time and frequency resources on which control information can be transmitted on a dedicated downlink control channel.

For determining the transmit beam for a dedicated downlink control channel, each control resource set 218 may be associated to one or more TCI states 212 (e.g., TCI rows). In case the control resource set 218 is associated with more than one TCI state 212, MAC-CE level activation signaling may be used to control which one of the multiple TCI states 212 is active at a time per control resource set 218. Search space set related parameters associated to the control resource set 218 define time domain monitoring pattern/occasions from which the user device 204 determines the starting positions of associated control resource set 218. Then, from associated (active) TCI state 212 of the control resource set 218, the user device 204 determines how to set its RX beam for the purpose of DL control channel estimation and dedicated control channel monitoring in that control resource set 218.

As shown in FIG. 2H, the first control resource set 218-1 includes three TCI states 212 (where the first TCI state is active (e.g., TCI state with index 0), and the second control resource set 218-2 includes one TCI state 212 (that is active). In some examples, the parameter mapping information 220 (as shown in FIG. 2H) associates one or more of the TCI states 212 of the first control resource set 218-1 with adaptive configuration parameters 222 for a downlink control channel 206 (e.g., GC-PDCCH). In the example of FIG. 2H, the first TCI state (TCI index 0) of the first control resource set 218-1 is associated with one or more adaptive configuration parameters 222, and the third TCI state (TCI index 5) of the first control resource set 218-1 is associated with one or more adaptive configuration parameters 222. In some examples, the parameter mapping information 220 (as shown in FIG. 2H) associates one or more TCI states 212 of the second control resource set 218-2 with adaptive configuration parameters 222 for a downlink control channel 206 (e.g., GC-PDCCH).

In some examples, in the case of multiple control resource sets 218, the user device 204 may determine which control resource set 218 is the primary control resource set. For example, if the control resource sets 218 include a first control resource set 218-1 and a second control resource set 218-2, the user device 204 may determine which of the first control resource set 218-1 and the second control resource set 218-2 is the primary resource set. In some examples, the primary control resource set is the one with the lowest index. For example, in FIG. 2H, since the first TCI state (TCI index 0) of the first control resource set 218-1 is the lowest index, the first control resource set 218-1 may be selected as the primary control resource set. In some examples, the primary control resource set is the one selected by the base station 202. For example, if the base station 202 selects the second control resource set 218-2, the second control resource set 218-2 is determined as the primary control resource set. In some examples, the primary control resource set is the control resource set 218 with the shortest associated monitoring periodicity based on the SS set configuration(s).

In some examples, if the TCI state 212 is changed (e.g., via the signaling message 208) for the primary control resource set, the user device 204 determines whether the new TCI state 212 is associated with one or more adaptive configuration parameters 222 for the downlink control channel 206 (e.g., GC-PDCCH). If so, the user device 204 may update the first control resource set 218-1 and the second control resource set 218-2 with the adaptive configuration parameters 222 to monitor the downlink control channel 206 within the first and second search spaces. In other words, the adaptive configuration parameters 222 associated with the primary control resource set may be used for other control resource sets 218. In further detail, if the first control resource set 218-1 is determined as the primary resource control set and the user device 204 receives a signaling message 208 that changes the TCI state 212 to the first TCI state (TCI index 0), the adaptive configuration parameter(s) 222 associated with the first TCI state of the first control resource set 218-1 may also be used for the active TCI state in the second control resource set 218-2.

In some examples, instead of determining which control resource set 218 is the primary control resource set, the user device 204 identifies the latest control resource set 218 that has been indicated with an active TCI state 212. Then, the latest control resource set 218 determines the applied adaptive configuration parameter(s) 222 for all of the control resource sets 218. In other words, the latest active TCI state 212 that has associated adaptive configuration parameter(s) 222 determines the applied GC-PDCCH configuration. For example, if the signaling message 208 indicates a change to the TCI state 212 (e.g., indicating TCI index 0 should be the activated state), the first control resource set 218-1 is the control resource set 218 that is the latest control resource set 218 that has been indicated with an active TCI state 212. Then, the adaptive configuration parameter(s) 222 associated with TCI index 0 is used for the first control resource set 218-1 and the second control resource set 218-2.

In some examples, the user device 204 (independently) determines the adaptive configuration parameters 222 for each control resource set 218. For example, if the first control resource set 218-1 is used (and the first TCI state is activated), the user device 204 determines that TCI index 0 is associated with adaptive configuration parameter(s) 222 using the parameter mapping information 220, and then uses those adaptive configuration parameter(s) 222 to configure the user device 204 to monitor the downlink control channel 206. Then, if the first control resource set 218-1 is used but the TCI state has been changed to TCI index 5, the user device 204 determines that the TCI index 5 is associated with another set of adaptive configuration parameter(s) 222 based on the parameter mapping information 220, and then uses those adaptive configuration parameter(s) 222 to configure the user device 204 to monitor the downlink control channel 206. Then, if the second control resource 218-2 is used, the user device 204 determines that the TCI state 212 of the second control resource 218-2 is associated with adaptive configuration parameter(s) 222, and then uses those adaptive configuration parameter(s) to monitor the downlink control channel 206.

After the adaptive configuration parameter(s) 222 are applied, the user device 204 begins to monitor the downlink control channel 206. In some examples, the user device 204 begins to monitor the downlink control channel 206 after a period of time from when a change to the beam information 210 is activated. In some examples, the user device 204 starts monitoring the DCI message(s) 207 (e.g., DCI formats) with the adaptive configuration parameter(s) 222 after the TCI state 212 is activated, where the time instance may be calculated after the user device 204 has acknowledged the TCI state change.

In some examples, the user device 204 starts monitoring the DCI messages 207 on the downlink control channel 206 at the next full monitoring occasion. In some examples, if the RNTI 228 and/or the starting bit position 243 is changed (e.g., with respect to the previous active TCI state 212), the user device 204 starts monitoring the DCI messages 207 on the downlink control channel 206 at the next full monitoring occasion. In some examples, if the RNTI 228 and/or the starting bit position 243 is changed (e.g., with respect to the previous active TCI state 212), the user device 204 starts monitoring the DCI messages 207 on the downlink control channel 206 at the start of next full duration (e.g., at period monitoringSlotPeriodicityAndOffset).

In some examples, the user device 204 starts monitoring the DCI messages 207 on the downlink control channel 206 from the first slot boundary, which may be at least 3 ms+HARQ-ACK after a MAC-CE message (e.g., signaling message 208) indicates an active TCI state change. In some examples, if the RNTI 228 and/or the starting bit position 243 is changed (same as in the previously active TCI state), the user device 204 starts monitoring the DCI messages 207 on the downlink control channel 206 at the first monitoring occasion in time at symbol and/or slot level after the delay associated to the change. In some examples, the user device 204 starts monitoring the DCI messages 207 on the downlink control channel 206 at N slots or N milliseconds after the activation. In some examples, the user device 204 starts monitoring the DCI messages 207 on the downlink control channel 206 at N slots or N milliseconds after the activation if the ending time/slot does not overlap with any DCI monitoring occasion (in between symbols of CORESET as per search space configuration or slot).

In some examples, the signaling message 208 identifies one or more adaptive configuration parameters 222. For example, the base station 202 may indicate a particular DCI format setting (or other configuration) using a MAC-CE message that indicates a change of an active TCI state for a physical dedicated control channel. The MAC CE information may include new bit location/offset or RNTI offset applied to the current configuration or used as a new configuration.

One or more adaptive configuration parameters 222 may be determined based on one or more adaptive configuration parameters 222 associated with the TCI state 212, DL-RS 214, or QCL source 216. In some examples, the starting bit position 243 (or the WUI bit position 240) is determined based on a modulo operation (e.g., a mod operation) using the beam information 210 (e.g., TCI state 212, DL-RS 214, or the QCL source 216), an identifier for the user device 204, and the size of the DCI format. For example, a position of UE-specific bit or bit field in the downlink control channel 206 can be determined pseudo randomly. A bit position in DCP (e.g., WUI bit position 240) for a particular user device 204 configured with a user identifier (e.g., C-RNTI) for a particular TCI state 212, DL-RS 214, or QCL source 216 may be defined by the following equation:

$$\text{bit}_{position} = \text{mod}(i + C_{RNTI}, N). \qquad \text{Eq. (1):}$$

The parameter i may refer to the TCI state 212, the DL-RS 214, or the QCL source 216, the parameter $C_{RNTI}$ may refer to the user identifier, and the parameter N is the size of DCI format payload allocated for all user devices 204. At low load, the probability that the bit position for two or more user devices is the same is relatively small, and the base station 202 does not have to configure bit positions per each TCI state 212. Furthermore, the exact bit position or a further offset to bit position determined by the above equation can be indicated fully or partially to the user device 204 by TCI-state MAC-CE activation command (e.g., signaling message 208). In case of partial indication, MAC-CE may indicate an offset to determine starting position given by an equation, such as equation (1). The pseudorandom determination may be configured by network per TCI state 212 or per DL-RS 214. In some examples, in case a TCI state 212 is not associated with TCI State specific configuration, the user device 204 may be configured to calculate the bit position.

The following description provides an example of adaptive configuration of a downlink control channel 206 using the power saving configuration parameters 238. When the user device 204 receives activation for a TCI state 212 for dedicated control channel for a control resource set 218 configured with search space associated with DCP monitoring configuration (e.g., search space with DCI format 2-6), the user device 204 may determine the DCP configuration (e.g., PS-RNTI 228-4 and/or WUI bit position 240) using the parameter mapping information 220.

For example, the user device 204 has not been configured with the power saving configuration parameters 238, the user device 204 monitors the WUS message 223 with the current parameters. If the user device 204 determines that power saving configuration parameters 238 are provided for an activated TCI state 212, the user device 204 starts monitoring the WUS message 223 with the TCI state specific parameters at first slot boundary after the TCI state 212 is activated. In some examples, the user device 204 starts monitoring the WUS message 223 in the next full monitoring occasion if the PS-RNTI 228-4 and/or the WUI bit position 240 is changed (with respect to the previous active TCI state 212). In some examples, the user device 204 starts monitoring the WUS message 223 at the next monitoring occasion that is not in the active time if the PS-RNTI 228-4 and/or the WUI bit position 240 is not changed (same as in the previously active TCI state 212). In some examples, the user device 204 starts monitoring the WUS message 223 at N slots and/or N milliseconds after the activation. In some examples, the user device 204 starts monitoring the WUS message 223 at N slots and/or N milliseconds after the activation if the ending time/slot does not overlap with any DCP occasion. In some examples, the user device 204 starts monitoring the WUS message 223 only starting from the next full monitoring occasion.

In some examples, if the user device 204 is not provided with power saving configuration parameters 238 for an activated TCI state 212, the user device 204 ceases monitoring of the WUS message 223 with the current parameters. In some examples, the user device 204 receives activation of a TCI state 212 that has power saving configuration parameters 238 and it has had previously been activated with a TCI state 212 that had no power saving configuration parameters 238 (and the user device 204 has not monitored it), the user device 204 may assume the power saving configuration parameters 238 for the said TCI state 212. In some examples, the user device 204 may use the power saving configuration parameters 238 only if a specific time has not passed, e.g., X milliseconds.

In some examples, if the user device 204 has been configured with power saving configuration parameters 238 for at least one TCI state 212 and it has received activation for a new TCI state 212, the user device 204 may determine if the TCI state 212 is associated with power saving configuration parameters 238. If not, the user device 204 is not allowed to continue monitoring the WUS message 223 with the current parameters or parameters associated with the previously active TCI state 212. If so, the user device 204 applies the new parameters, or continues with the current ones, depending on the configuration of the parameters. In some examples, the user device 204 is configured with default configuration parameter(s) 224 for the power saving configuration parameters 238, and only for specific TCI states 212, the user device 204 determines if an alternative configuration is provided. If an alternative configuration is not provided, the user device 204 monitors the WUS message 223 using the default configuration parameter(s) 224 except for the specific TCI state 212 with alternative configuration. In some examples, when the user device 204 receives activation for a new TCI state 212 that is not associated with new/different TCI State specific DCP, the user device 204 is configured with one or more current configuration parameters. If the user device 204 has not been configured with any power saving configuration parameters 238 for any specific TCI states 212, the user device 204 continues to monitor the downlink control channel 206 in baseline operation with current configuration parameters.

In some examples, the base station 202 can configure whether the power saving configuration parameters 238 are specific for a TCI state 212, DL-RS 214, or QCL source 216. In some examples, if the TCI state/DL-RS specific DCP configuration is a DL-RS specific (such as SSB), then the user device 204 receives the TCI state activation for a CORESET with DCP configuration, the user device 204 determines the QCL source or the QCL source that is the SSB for the activated TCI state and determines whether the DCP parameters need to be updated. In some examples, the user device 204 may be configured with a TCI_state_1, TCI_State_2, TCI_State_3 and TCI_State_4. TCI_state_1 and _2 are associated with PS-RNTI_1, _3 and _4 with PS-RNTI_2. When the user device 204 has an active TCI state 212 that is TCI state_1 for a CORESET with a DCP configuration, the user device 204 utilizes the PS-RNTI_1 for monitoring DCP, and when network activates TCI State_3, the user device 204 assumes the PS-RNTI_2.

Figure 3:
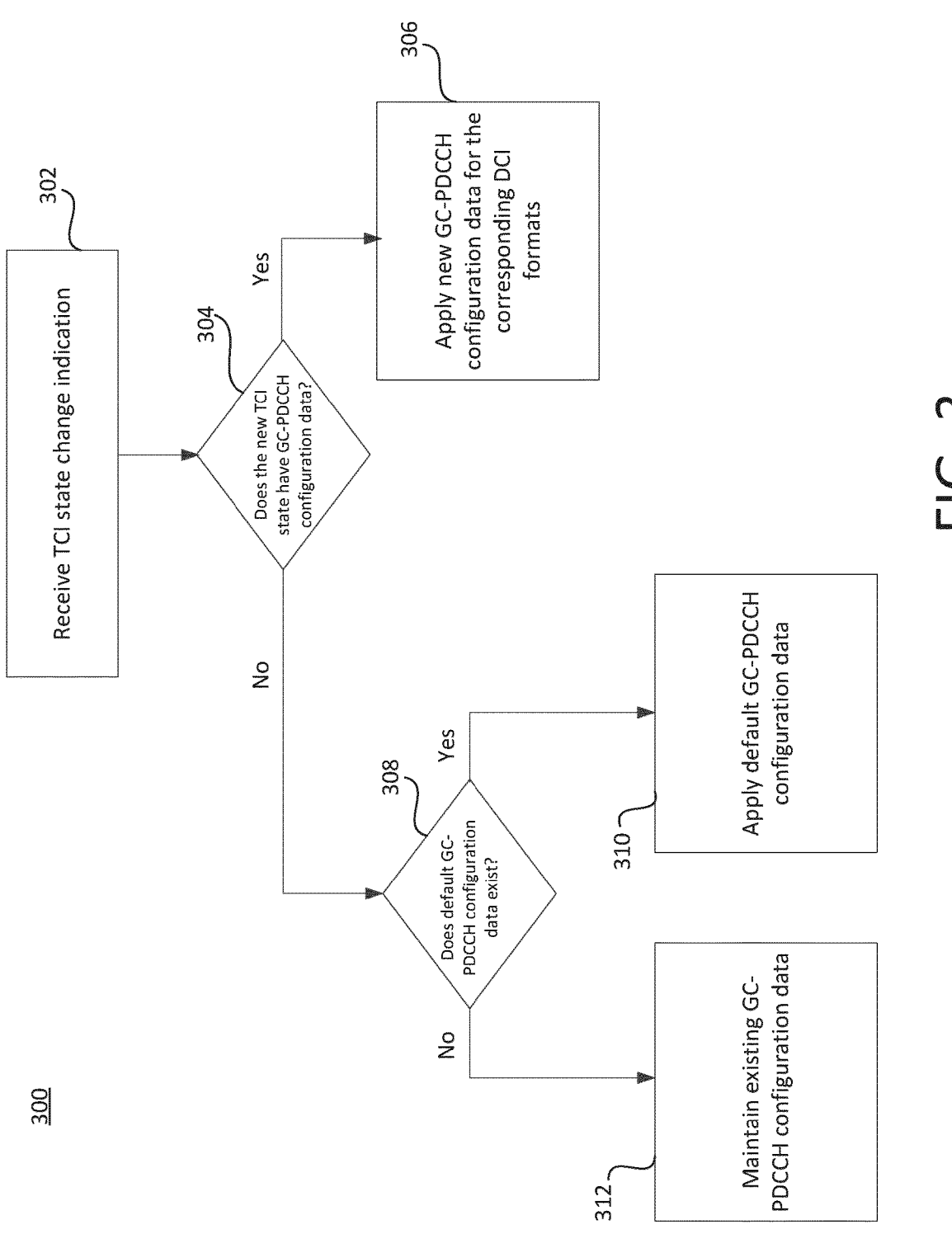
FIG. 3 illustrates a flowchart depicting example operations of determining adaptive configuration parameters for a downlink control channel according to an aspect.

FIG. 3 illustrates a flowchart 300 depicting example operations of a wireless communication system according to an aspect. Although the flowchart 300 is described with reference to the wireless communication system 200 of FIGS. 2A through 2H, the operations may be executed by any of the embodiments discussed herein. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

The flowchart 300 relates to automatically configuring configuration parameters to monitor (or continue to monitor) a downlink control channel 206 (e.g., GC-PDCCH). For example, the wireless communication system 200 enables the configuration of a user device 204 to monitor a downlink control channel 206 (e.g., GC-PDCCH) with one or more adaptive configuration parameters 222, where the adaptive configuration parameters 222 are determined at the user device 204 based on beam information 210 (or changes to the beam information 210). For example, if a user device 204 receives a change to beam information 210 (e.g., it moved to a different area within a cell or a different cell), the user device 204 may obtain one or more adaptive configuration parameters 222 that are associated with the new beam information 210 and use these adaptive configuration parameters 222 to monitor a downlink control channel 206 such as a GC-PDCCH. In this manner, the user device 204 may be configured to monitor the GC-PDCCH such that the RRC signaling that otherwise would be used to perform the configuration may be minimized or avoided. Also, it is noted that although the flowchart describes example operations using TCI state specific information, flowchart 300 may be applicable to any type of parameter mapping information 220 described herein.

Operation 302 includes receiving TCI state change indication. For example, the user device 204 may receive a signaling message 208 from a base station 202. In some examples, the signaling message 208 is a MAC-CE message. In some examples, the signaling message 208 indicates a TCI state 212 to be activated. In some examples, the TCI state 212 relates to a TCI state defined in a TCI table 251 associated with one or more control resource sets 218. The TCI state 212 relates to transmit beam information for a dedicated control channel, that may be different from the downlink control channel 206 (e.g., the GC-PDCCH).

Operation 304 includes determining whether the new TCI state has GC-PDCCH configuration data. For example, the user device 204 may determine whether adaptive configuration parameter(s) 222 is associated with the TCI state 212 identified by the signaling message 208 based on parameter mapping information 220, which associated different values for the adaptive configuration parameter(s) 222 for one or more TCI states 212 defined in the TCI table 251. In some examples, as indicated above (and below), the parameter mapping information 220 may associate (e.g., link) adaptive configuration parameters 222 to one or more the DL-RSs 214 indicated by the TCI states 212, or to one or more DL-RSs 214 or one or more QCL sources 216 of the DL-RS 214 indicated by the TCI state 212, or to one or more DL-RSs 214 of a specific QCL source type indicated by the TCI state 212.

Operation 306 includes applying the new GC-PDCCH configuration data for the corresponding DCI formats if the new TCI state is associated with GC-PDCCH configuration data. For example, if the parameter mapping information 220 indicates that adaptive configuration parameter(s) 222 is associated with the TCI state 212, the user device 204 applies the adaptive configuration parameter(s) 222 to monitor the DCI messages 207 on the downlink control channel 206. The adaptive configuration parameter(s) 222 may be any one or more of the parameters discussed with reference to FIG. 2D (or throughout the specification).

Operation 308 includes determining whether default GC-PDCCH configuration data exists if the new TCI state is not associated with GC-PDCCH configuration data. For example, if the parameter mapping information 220 indicates that adaptive configuration parameter(s) 222 are not associated with the activated TCI state 212, the user device 204 determines whether one or more default configuration parameter(s) 224 exist for the activated TCI state 212.

Operation 310 includes applying the default GC-PDCCH configuration data in response to the determination that default GC-PDCCH configuration data exists. For example, if the default configuration parameter(s) 224 exist for the activated TCI state 212, the user device 204 applies the default configuration parameter(s) 224 to monitor the downlink control channel 206.

Operation 312 includes maintaining existing GC-PDCCH configuration data in response to the determination that default GC-PDCCH configuration data does not exist. For example, if the default configuration parameter(s) 224 do not exist for the activated TCI state 212, the user device 204 maintains the existing configuration parameters to monitor the downlink control channel 206.

FIG. 4 illustrates a flowchart 400 depicting example operations of a wireless communication system according to an aspect. Although the flowchart 400 is described with reference to the wireless communication system 200 of FIGS. 2A through 2H, the operations may be executed by any of the embodiments discussed herein. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Operation 402 includes receiving, by a user device 204 from a base station 202 in a wireless communication system 200, a signaling message 208 identifying beam information 210.

Operation 404 includes determining, by the user device 204, whether the beam information 210 is associated with at least one adaptive configuration parameter 222 for monitoring a downlink control channel 206 using parameter mapping information 220, where the parameter mapping information 220 links adaptive configuration parameters 222 with one or more of a plurality of beam information 210.

Operation 406 includes applying the at least one adaptive configuration parameter 222 to configure the user device 204 to monitor a downlink control channel 206 in response to the beam information 210 being determined as associated with the at least one adaptive configuration parameter 222.

In some examples, the beam information 210 of the signaling message 208 identifies a transmission configuration indicator (TCI) state 212. In some examples, the parameter mapping information 220 associates one or more adaptive configuration parameters 222 with a plurality of TCI states 212. In some examples, the parameter mapping information 220 may associate (e.g., link) adaptive configuration parameters 222 to one or more the DL-RSs 214 indicated by the TCI states 212, or to one or more DL-RSs 214 or one or more QCL sources 216 of the DL-RS 214 indicated by the TCI state 212, or to one or more DL-RSs 214 of a specific QCL source type indicated by the TCI state 212. In some examples, the beam information 210 of the signaling message 208 identifies a downlink reference signal 214 (or a value/index/identifier for the downlink reference signal 214). In some examples, the parameter mapping information 220 associates one or more adaptive configuration parameters 222 with a plurality of downlink reference signals 214. In some examples, the beam information 210 of the signaling message 208 identifies a quasi-colocation (QCL) source 216.

The parameter mapping information 220 associates one or more adaptive configuration parameters 222 with a plurality of QCL sources 216. The downlink control channel 206 includes a group downlink control channel (e.g., GC-PDCCH). In some examples, the downlink control channel 206 includes a dedicated or user specific downlink control channel. In some examples, the method includes monitoring the downlink control channel 206 with one or more existing configuration parameters in response to the beam information 210 being determined as not associated with the at least one adaptive configuration parameter 222. In some examples, the method includes ceasing to monitor the downlink control channel 206 in response to the beam information 210 being determined as not associated with the at least one adaptive configuration parameter 222.

The method may include determining whether the beam information 210 is associated with at least one default configuration parameter 224 in response to the beam information 210 being determined as not associated with the at least one adaptive configuration parameter 222. The method may include applying the at least one default configuration parameter 224 in response to the beam information 210 being determined as associated with the at least one default configuration parameter 224. The method may include maintaining one or more existing configuration parameters in response to the beam information 210 being determined as not associated with the at least one default configuration parameter 224. The method may include monitoring, by the user device 204, the downlink control channel 206 after a period of time from a time when a change to the beam information 210 is activated.

The at least one adaptive configuration parameter 222 may include a radio network temporary identifier (RNTI) 228. The at least one adaptive configuration parameter 222 includes at least one of a size of a downlink control information (DCI) format, a starting bit position 243 for device-specific information within the DCI format, a payload size 245 of the device-specific information, and a radio network temporary identifier (RNTI) value used for monitoring the DCI format. In some examples, the starting bit position 243 is determined based on a modulo operation using the beam information 210, an identifier for the user device 204, and the size of the DCI format. The at least one adaptive configuration parameter 222 may include at least one of a bit position 240 for a wake-up indicator 225, a size of a downlink control information (DCI) format, or a power-saving radio network temporary identifier (PS-RNTI) value used for monitoring the DCI format. In some examples, the signaling message 208 is a medium access control (MAC) control element (CE) (MAC-CE) message. In some examples, the user device 204 defines a plurality of control resource sets 218 including a first control resource set 218-1 for a first search space and a second control resource set 218-2 for a second search space.

The method may include selecting the second control resource set 218-2 as a primary resource set, determining that the at least one adaptive configuration parameter 222 is associated with the second control resource set 218-2 based on the parameter mapping information 220, and updating the first control resource set 218-1 and the second control resource set 218-2 with the at least one adaptive configuration parameter 222 to monitor the downlink control channel 206 within the first search space and the second search space. The method may include determining that the beam information 210 included within the signaling message 208 relates to the second control resource set 218-2, determining that the at least one adaptive configuration parameter 222 is associated with the second control resource set 218-2 based on the parameter mapping information 220, and updating the first control resource set 218-1 and the second control resource set 218-2 with the at least one adaptive configuration parameter 222 to monitor the downlink control channel 206 within the first search space and the second search space.

Example 1. A method for configuring user devices to monitor a downlink control channel, the method comprising: receiving, by a user device from a base station in a wireless communication system, a signaling message identifying beam information; determining, by the user device, whether the beam information is associated with at least one adaptive configuration parameter for monitoring a downlink control channel using parameter mapping information, the parameter mapping information associating adaptive configuration parameters with one or more of a plurality of beam information; and applying the at least one adaptive configuration parameter to configure the user device to monitor a downlink control channel in response to the beam information being determined as associated with the at least one adaptive configuration parameter.

Example 2. The method of example 1, wherein the beam information of the signaling message identifies a transmission configuration indicator (TCI) state for a control resource set.

Example 3. The method of any of examples 1-2, wherein the parameter mapping information associates one or more adaptive configuration parameters with a plurality of TCI states.

Example 4. The method of any of examples 1-3, wherein the parameter mapping information may associate (e.g., link) one or more adaptive configuration parameters to one or more the DL-RSs indicated by the TCI states.

Example 5. The method of any of examples 1-4, wherein the parameter mapping information may associate (e.g., link) one or more adaptive configuration parameters to one or more DL-RSs or one or more QCL sources of the DL-RS indicated by the TCI state.

Example 6. The method of any of examples 1-5, wherein the parameter mapping information may associate (e.g., link) one or more adaptive configuration parameters to one or more DL-RSs of a specific QCL source type indicated by the TCI state.

Example 7. The method of any of examples 1-6, wherein the beam information of the signaling message identifies a downlink reference signal.

Example 8. The method of any of examples 1-7, wherein the parameter mapping information associates one or more adaptive configuration parameters with a plurality of downlink reference signals.

Example 9. The method of any of examples 1-8, wherein the beam information of the signaling message identifies a quasi-colocation (QCL) source.

Example 10. The method of any of examples 1-9, wherein the parameter mapping information associates one or more adaptive configuration parameters with a plurality of QCL sources.

Example 11. The method of any of examples 1-10, wherein the downlink control channel includes a group downlink control channel.

Example 12. The method of any of examples 1-11, wherein the method includes monitoring the downlink control channel with one or more existing configuration parameters in response to the beam information being determined as not associated with the at least one adaptive configuration parameter.

Example 13. The method of any of examples 1-12, wherein the method includes ceasing to monitor the downlink control channel in response to the beam information being determined as not associated with the at least one adaptive configuration parameter.

Example 14: The method of any of examples 1-13, wherein the method includes determining whether the beam information is associated with at least one default configuration parameter in response to the beam information being determined as not associated with the at least one adaptive configuration parameter.

Example 15. The method of any of examples 1-14, wherein the method includes applying the at least one default configuration parameter in response to the beam information being determined as associated with the at least one default configuration parameter.

Example 16. The method of any of examples 1-15, wherein the method includes maintaining one or more existing configuration parameters in response to the beam information being determined as not associated with the at least one default configuration parameter.

Example 17. The method of any of examples 1-16, wherein the method includes monitoring, by the user device, the downlink control channel after a period of time from a time when a change to the beam information is activated.

Example 18. The method of any of examples 1-17, wherein the at least one adaptive configuration parameter includes a radio network temporary identifier (RNTI).

Example 19. The method of any of examples 1-18, wherein the at least one adaptive configuration parameter includes at least one of a size of a downlink control information (DCI) format.

Example 20. The method of any of examples 1-19, wherein the at least one adaptive configuration parameter includes a starting bit position for device-specific information within the DCI format.

Example 21. The method of any of examples 1-20, wherein the at least one adaptive configuration parameter includes a payload size of the device-specific information.

Example 22. The method of any of examples 1-21, wherein the at least one adaptive configuration parameter includes a radio network temporary identifier (RNTI) value used for monitoring the DCI format.

Example 23. The method of any of examples 1-22, wherein the DCI format includes a slot format message.

Example 24. The method of any of examples 1-23, wherein the DCI format includes a power control message.

Example 25. The method of any of examples 1-24, wherein the DCI format includes a pre-emption message.

Example 26. The method of any of examples 1-25, wherein the DCI format includes a WUS message.

Example 27. The method of any of examples 1-26, wherein the starting bit position is determined based on a modulo operation using the beam information, an identifier for the user device, and/or the size of the DCI format.

Example 28. The method of any of examples 1-27, wherein the at least one adaptive configuration parameter includes at least one of a bit position for a wake-up indicator.

Example 29. The method of any of examples 1-28, wherein the at least one adaptive configuration parameter includes a size of a downlink control information (DCI) format.

Example 30. The method of any of examples 1-29, wherein the at least one adaptive configuration parameter includes a power-saving radio network temporary identifier (PS-RNTI) value used for monitoring the DCI format.

Example 31. The method of any of examples 1-30, wherein the signaling message is a medium access control (MAC) control element (CE) (MAC-CE) message.

Example 32. The method of any of examples 1-31, wherein the user device defines a plurality of control resource sets including a first control resource set for a first search space and a second control resource set for a second search space.

Example 33. The method of any of examples 1-32, wherein the method includes selecting the second control resource set as a primary resource set.

Example 34. The method of any of examples 1-33, wherein the method includes determining that the at least one adaptive configuration parameter is associated with the second control resource set based on the parameter mapping information.

Example 35. The method of any of examples 1-34, wherein the method includes updating the first control resource set and the second control resource set with the at least one adaptive configuration parameter to monitor the downlink control channel within the first search space and the second search space.

Example 36. The method of any of examples 1-35, wherein the method includes determining that the beam information included within the signaling message relates to the second control resource set.

Example 37. The method of any of examples 1-36, wherein the method includes determining that the at least one adaptive configuration parameter is associated with the second control resource set based on the parameter mapping information.

Example 38. The method of any of examples 1-37, wherein the method includes updating the first control resource set and the second control resource set with the at least one adaptive configuration parameter to monitor the downlink control channel within the first search space and the second search space.

Example 39. A non-transitory computer-readable storage medium comprising instructions stored thereon that, when executed by at least one processor, are configured to cause a computing system to perform the method of any of examples 1-38.

Example 40. An apparatus comprising: at least one processor; and at least one memory including computer program code, the at least one memory and the computer program code configured to, with the at least one processor, cause the apparatus at least to perform any of examples 1-38.

Example 41. An apparatus comprising means for performing the method of any of examples 1-38.

Figure 5:
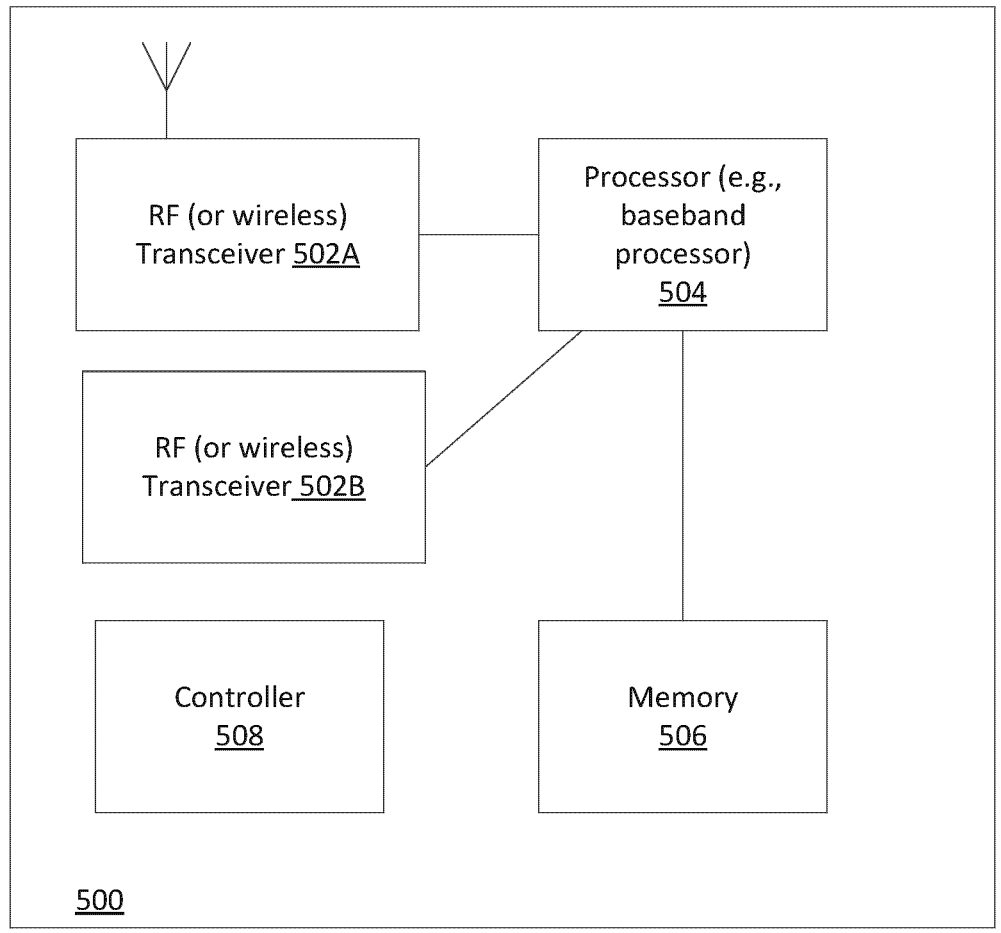
FIG. 5 is a block diagram of a wireless station according to an example implementation.

FIG. 5 is a block diagram of a wireless station (e.g., AP or user device) 500 according to an example implementation. The wireless station 500 may include, for example, one or two RF (radio frequency) or wireless transceivers 502A, 502B, where each wireless transceiver includes a transmitter to transmit signals and a receiver to receive signals. The wireless station also includes a processor or control unit/entity (controller) 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502A or 502B. Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above (e.g., any of the operations of the timing diagrams and flowcharts of the figures). Processor 504 may be (or may include), for example, hardware, programmable logic, a programmable processor that executes software or firmware, and/or any combination of these. The processor 504 may include one or more processors coupled to a substrate. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor (e.g., a processor coupled to a substrate), a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (e.g., sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors (e.g., one or more processors coupled to a substrate) executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method for configuring user devices to monitor a downlink control channel, the method comprising:
receiving, with a user device from a base station in a wireless communication system, a signaling message identifying beam information, wherein the user device defines a plurality of control resource sets including a first control resource set for a first search space and a second control resource set for a second search space;
determining, with the user device, whether the beam information is associated with at least one adaptive configuration parameter for monitoring a downlink control channel using parameter mapping information, the parameter mapping information associating adaptive configuration parameters with one or more of a plurality of beam information;
applying the at least one adaptive configuration parameter to configure the user device to monitor a downlink control channel in response to the beam information being determined as associated with the at least one adaptive configuration parameter;
selecting the second control resource set as a primary resource set;
determining that the at least one adaptive configuration parameter is associated with the second control resource set based on the parameter mapping information; and
updating the first control resource set and the second control resource set with the at least one adaptive configuration parameter to monitor the downlink control channel within the first search space and the second search space.

2. The method of claim 1, wherein the beam information of the signaling message identifies a transmission configuration indicator state for a control resource set.

3. The method of claim 2, wherein the parameter mapping information associates one or more adaptive configuration parameters with a plurality of transmission configuration indicator states.

4. The method of claim 1, wherein the beam information of the signaling message identifies a downlink reference signal.

5. The method of claim 4, wherein the parameter mapping information associates one or more adaptive configuration parameters with a plurality of downlink reference signals.

6. The method of claim 1, wherein the beam information of the signaling message identifies a quasi-colocation source.

7. The method of claim 6, wherein the parameter mapping information associates one or more adaptive configuration parameters with a plurality of quasi-colocation sources.

8. The method of claim 1, wherein the downlink control channel includes a group downlink control channel.

9. The method of claim 1, further comprising:
monitoring the downlink control channel with one or more existing configuration parameters in response to the beam information being determined as not associated with the at least one adaptive configuration parameter.

10. The method of claim 1, further comprising:

ceasing to monitor the downlink control channel in response to the beam information being determined as not associated with the at least one adaptive configuration parameter.

11. The method of claim 1, further comprising:

determining whether the beam information is associated with at least one default configuration parameter in response to the beam information being determined as not associated with the at least one adaptive configuration parameter;

applying the at least one default configuration parameter in response to the beam information being determined as associated with the at least one default configuration parameter; and maintaining one or more existing configuration parameters in response to the beam information being determined as not associated with the at least one default configuration parameter.

12. The method of claim 1, further comprising:

monitoring, with the user device, the downlink control channel after a period of time from a time when a change to the beam information is activated.

13. The method of claim 1, wherein the at least one adaptive configuration parameter includes a radio network temporary identifier.

14. The method of claim 1, wherein the at least one adaptive configuration parameter includes at least one of:

a size of a downlink control information format, a starting bit position for device-specific information within the downlink control information format, a payload size of the device-specific information, or a radio network temporary identifier value used for monitoring the downlink control information format.

15. The method of claim 14, wherein the starting bit position is determined based on a modulo operation using the beam information, an identifier for the user device, and the size of the downlink control information format.

16. The method of claim 1, wherein the at least one adaptive configuration parameter includes at least one of:

a bit position for a wake-up indicator, a size of a downlink control information format, or a power-saving radio network temporary identifier value used for monitoring the downlink control information format.

17. The method of claim 1, wherein the signaling message is a medium access control (MAC) control element (CE) (MAC-CE) message.

18. The method of claim 1, wherein the user device defines a plurality of control resource sets including a first control resource set for a first search space and a second control resource set for a second search space, the method further comprising:

determining that the beam information included within the signaling message relates to the second control resource set;

determining that the at least one adaptive configuration parameter is associated with the second control resource set based on the parameter mapping information;

updating the first control resource set and the second control resource set with the at least one adaptive configuration parameter to monitor the downlink control channel within the first search space and the second search space.

* * * * *